US 9,674,733 B2

(12) United States Patent
Faccin et al.

(10) Patent No.: US 9,674,733 B2
(45) Date of Patent: Jun. 6, 2017

(54) INTERWORKING LINK LAYER TRAFFIC AGGREGATION WITH SYSTEM LEVEL MOBILITY

(71) Applicant: QUALCOMM Incorporated, San Diego, CA (US)

(72) Inventors: Stefano Faccin, Hayward, CA (US); Gavin Bernard Horn, La Jolla, CA (US); Ozcan Ozturk, San Diego, CA (US)

(73) Assignee: QUALCMM Incorporated, San Diego, CA (US)

( * ) Notice: Subject to any disclaimer, the term of this patent is extended or adjusted under 35 U.S.C. 154(b) by 99 days.

(21) Appl. No.: 14/721,305

(22) Filed: May 26, 2015

(65) Prior Publication Data
US 2015/0350954 A1 Dec. 3, 2015

Related U.S. Application Data

(60) Provisional application No. 62/003,387, filed on May 27, 2014.

(51) Int. Cl.
| | | |
|---|---|---|
| *H04W 28/12* | (2009.01) | |
| *H04W 28/02* | (2009.01) | |
| *H04W 76/02* | (2009.01) | |
| *H04W 84/12* | (2009.01) | |

(Continued)

(52) U.S. Cl.
CPC ....... *H04W 28/12* (2013.01); *H04W 28/0263* (2013.01); *H04W 76/026* (2013.01); *H04L 5/0098* (2013.01); *H04W 84/12* (2013.01); *H04W 88/06* (2013.01)

(58) Field of Classification Search
CPC ............. H04W 28/12; H04W 28/0263; H04W 76/026; H04W 84/12; H04W 88/06; H04L 5/0098
See application file for complete search history.

(56) References Cited

U.S. PATENT DOCUMENTS

| | | | |
|---|---|---|---|
| 2011/0305220 A1 | 12/2011 | Lindoff et al. | |
| 2013/0017826 A1* | 1/2013 | Bergquist | H04W 12/08 455/426.1 |
| 2013/0242843 A1 | 9/2013 | Kojima | |

(Continued)

FOREIGN PATENT DOCUMENTS

| | | |
|---|---|---|
| WO | 2012154506 A1 | 11/2012 |
| WO | 2013138046 A1 | 9/2013 |

OTHER PUBLICATIONS

Ericsson, et al., "Properties of a Cell Index", 3GPP Draft; R2-103617 Properties of a Cell Index, 3rd Generation Partnership Project (3GPP), Mobile Competence Centre; 650, Route Des Lucioles; F-06921 Sophia-Antipolis Cedex; France, vol. RAN WG2. No. Stockholm. Sweden; 20100628, Jun. 21, 2010 (Jun. 21, 2010), 2 Pages, XP050451016, [retrieved on Jun. 21, 2010] the whole document.

(Continued)

*Primary Examiner* — Duc C Ho
(74) *Attorney, Agent, or Firm* — Patterson & Sheridan, LLP

(57) ABSTRACT

Methods and apparatus for routing data bearers of a user equipment (UE) while the UE is associated to a base station (BS) of a first radio access technology (RAT) while being served by a BS of a second RAT.

26 Claims, 16 Drawing Sheets

(51) Int. Cl.
    *H04L 5/00*     (2006.01)
    *H04W 88/06*    (2009.01)

(56)                References Cited

U.S. PATENT DOCUMENTS

2014/0341039 A1* 11/2014 Rubin ............... H04W 28/0231
                                                    370/235
2016/0112896 A1*  4/2016 Karampatsis ..... H04W 28/0252
                                                    370/230.1
2016/0142954 A1*  5/2016 Cho ..................... H04W 36/36
                                                    370/331
2016/0277974 A1*  9/2016 Persson ................ H04W 48/16

OTHER PUBLICATIONS

International Search Report and Written Opinion—PCT/US2015/032525—ISA/EPO—Oct. 6, 2015.
RAN2: "LS on CIF values", 3GPP Draft; R2-104209, 3rd Generation Partnership Project (3GPP), Mobile Competence Centre; 650, Route Des Lucioles; F-06921 Sophia-Antipolis Cedex; France, vol. RAN WG2, No. Stockholm, Sweden; 20100628, Jul. 2, 2010 (Jul. 2, 2010), 1 Page, XP050451442, [retrieved on Jul. 2, 2010] the whole document.
Xavier L., "Very tight coupling between LTE and Wi-Fi for advanced offloading procedures", 2014 IEEE Wireless Communications and Networking Conference Workshops (WCNCW), IEEE, Apr. 6, 2014 (Apr. 6, 2014), pp. 82-86, XP032668389, DOI: 10.1109/WCNCW.2014.6934865, [retrieved on Oct. 22, 2014].

* cited by examiner

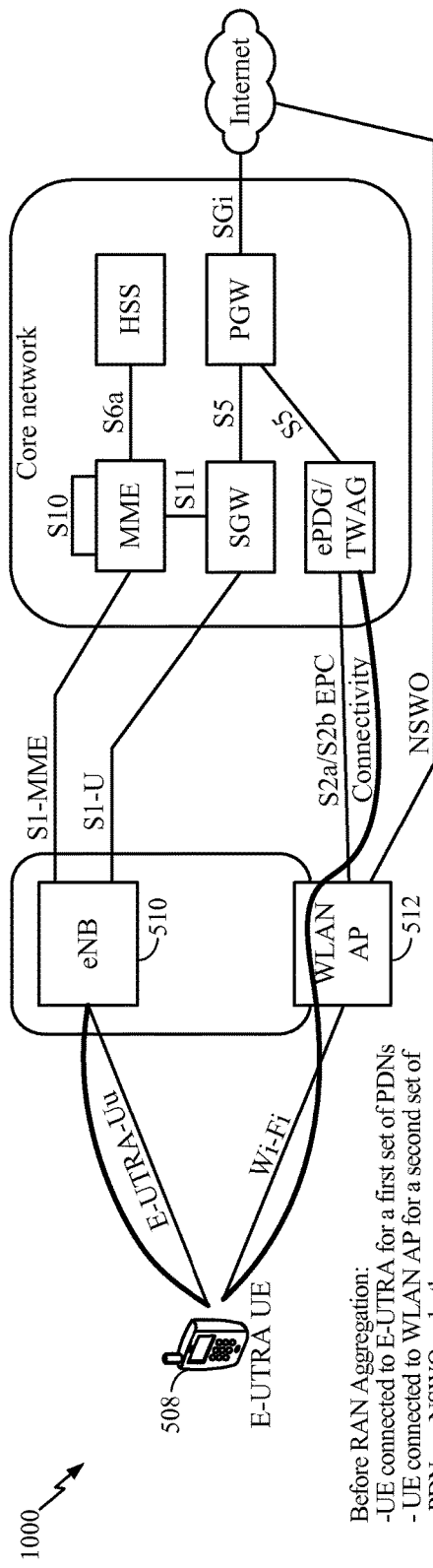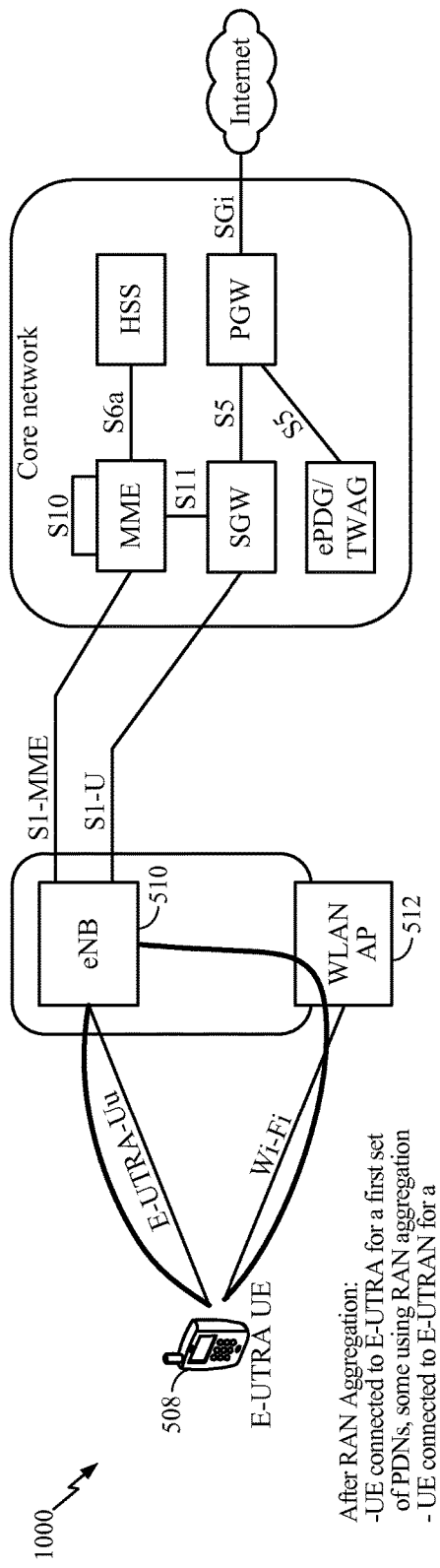

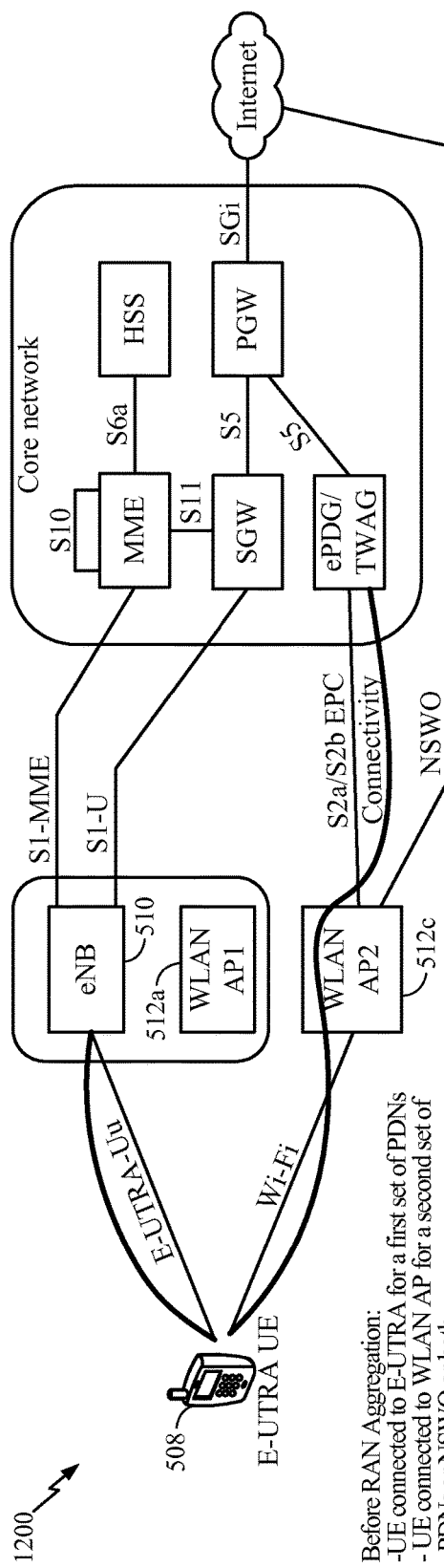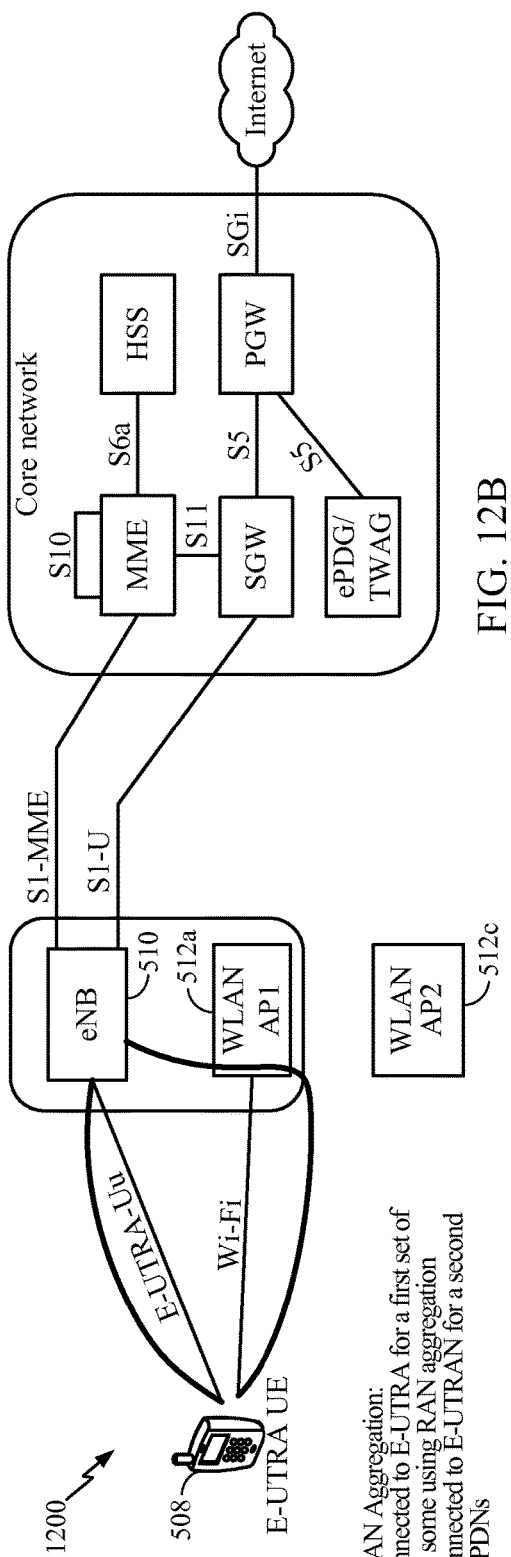
FIG. 12A
FIG. 12B

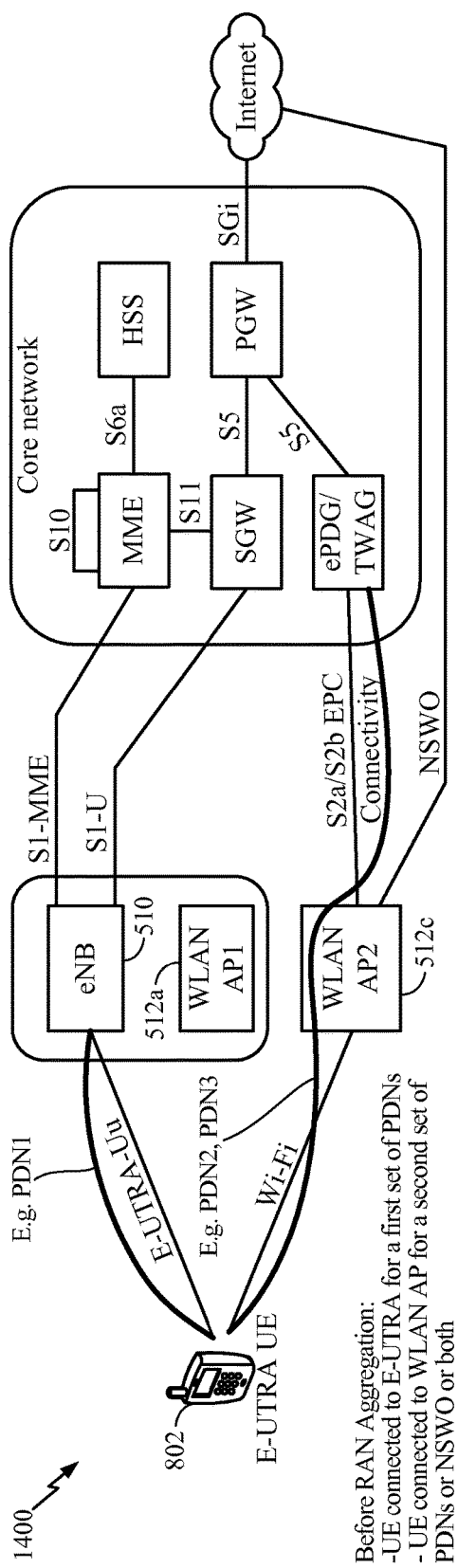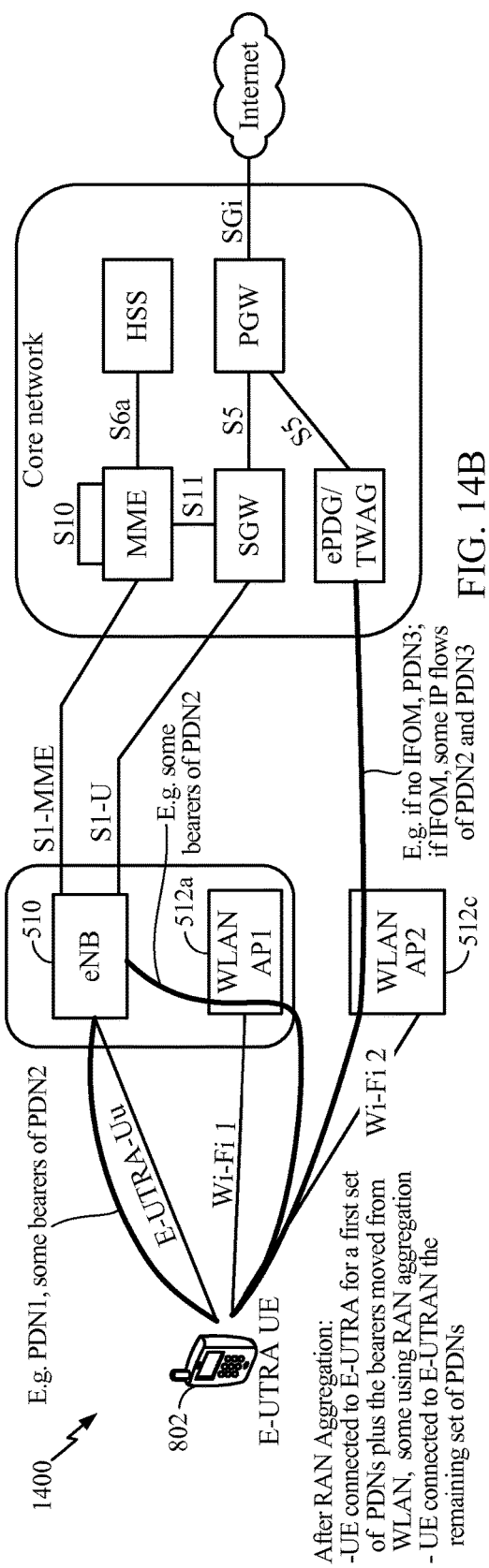

INTERWORKING LINK LAYER TRAFFIC AGGREGATION WITH SYSTEM LEVEL MOBILITY

CROSS-REFERENCE TO RELATED APPLICATIONS

The present application for patent claims priority to U.S. Provisional Application No. 62/003,387, filed May 27, 2014, which is assigned to the assignee of the present application and hereby expressly incorporated by reference herein in its entirety.

BACKGROUND

Field of the Disclosure

Certain aspects of the present disclosure generally relate to wireless communications and, more particularly, to techniques for routing data in a system that supports aggregation using different radio access technologies (RATs).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

In some cases, such a system may allow traffic to be offloaded from one network, such as a wireless wide area network (WWAN) to a second network, such as a wireless unlicensed local area network (here referred to generically as WLAN, e.g. based on WLAN or Wi-Fi technology, or WWAN technologies used in unlicensed spectrum such as LTE unlicensed).

SUMMARY

Certain aspects of the present disclosure provide a method for wireless communications performed by a first base station (BS) of a first radio access technology (RAT). The method generally includes determining that a user equipment (UE), served by the first BS and by a second BS of a WLAN, is capable of participating in radio access network (RAN) aggregation, and activating RAN aggregation for the UE of one or more bearers of one or more packet data network (PDN) connections with the first BS and at least one of the second BS or another BS of a WLAN, while maintaining the one or more PDN connections as active only over the RAN or over both the RAN and the WLAN simultaneously.

Certain aspects of the present disclosure provide a method for wireless communications performed by a user equipment (UE). The method generally includes receiving an indication to begin radio access network (RAN) aggregation of one or more bearers belonging to one or more packet data network (PDN) connections while being served by a first base station (BS) of a WLAN and a second BS of a RAN and taking action to perform RAN aggregation of the one or more bearers belonging to one or more PDN connections while maintaining the one or more PDN connections as active only over the RAN or over both the RAN and the WLAN simultaneously.

Certain aspects of the present disclosure provide a first base station (BS) of a first radio access technology (RAT). The first BS generally includes at least one antenna and at least one processor configured to determine that a user equipment (UE), served by the first BS and by a second BS of a WLAN, is capable of participating in radio access network (RAN) aggregation, and activate RAN aggregation for the UE of one or more bearers of one or more packet data network (PDN) connections with the first BS and at least one of the second BS or another BS of a WLAN, while maintaining the one or more PDN connections as active only over the RAN or over both the RAN and the WLAN simultaneously.

Certain aspects of the present disclosure provide a user equipment (UE). The UE generally includes at least one antenna and at least one processor configured to receive an indication to begin radio access network (RAN) aggregation of one or more bearers belonging to one or more packet data network (PDN) connections while being served by a first base station (BS) of a WLAN and a second BS of a RAN and take action to perform RAN aggregation of the one or more bearers belonging to one or more PDN connections while maintaining the one or more PDN connections as active only over the RAN or over both the RAN and the WLAN simultaneously.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 10A and 10B illustrate an exemplary wireless communication system in which RAN aggregation may be used, in accordance with certain aspects of the present disclosure.

FIGS. 12A and 12B illustrate an exemplary wireless communication system in which RAN aggregation may be used, in accordance with certain aspects of the present disclosure.

FIGS. 14A and 14B illustrate an exemplary wireless communication system in which RAN aggregation may be used, in accordance with certain aspects of the present disclosure.

DETAILED DESCRIPTION

Figure 1:
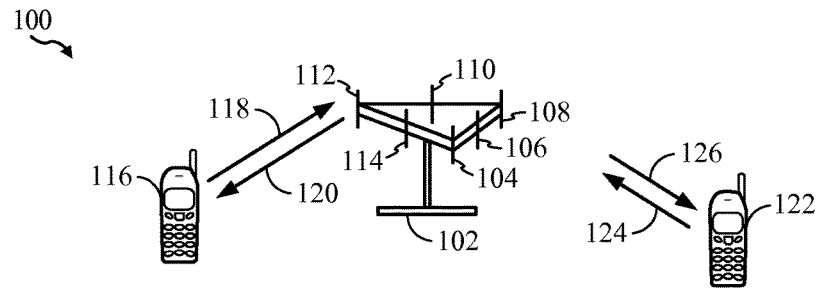
FIG. 1 illustrates an example multiple access wireless communication system in accordance with certain aspects of the present disclosure.

According to aspects of the present disclosure, techniques are provided to enable wireless network operators (e.g., cellular network operators) to route both DL and UL traffic for a UE via both a wireless wide-area network (e.g., a 3GPP network) and one or more wireless local-area networks, (e.g., Wi-Fi). A UE may simultaneously connect to both a wireless wide-area network (WWAN) and one or more wireless local-area networks (WLANs), and WWAN entities (e.g., an eNB) may determine to convey certain packets to/from the UE via the WWAN, while conveying other packets to/from the UE via the WLANs. For example, packets for a voice over internet protocol (VOIP) call may be conveyed to/from the UE via an eNB using a 3GPP LTE cellular network, while packets of an email application are being conveyed to/from the UE via a Wi-Fi access point (AP) using an IEEE 802.11ac Wi-Fi network.

In general, offloading traffic from a cellular network to a wireless local-area network (WLAN) may be desirable, because operator deployed WLANs are often under-utilized. However, user experience is suboptimal when a UE connects to an overloaded WLAN network. According to aspects of the present disclosure, mobile operators (i.e., cellular network operators) may be able to control which traffic is routed over WLAN and which traffic is kept on the wireless wide-area network (WWAN) (e.g., 3GPP RAN). Whether to switch bearers from WWAN to WLAN or vice-versa may be determined based on the main objectives of serving bearers with a "better" link for each bearer, while maximizing a system utility function (e.g., total system throughput). This combining of RANs to serve a UE may be referred to as "RAN aggregation." More specifically, RAN aggregation is an approach for offloading traffic between 3GPP access networks like LTE and non-3GPP access networks like Wi-Fi. Inter-working between WWANs (3GPP access networks like LTE) and WLANs (non-3GPP access networks like Wi-Fi) for data offloading can also be enabled by RAN rules. These rules may be either broadcast or sent via dedicated RRC signaling. In addition, non-access stratum (NAS) messages may be used to give supplementary information such as the name of access packet networks (APNs) that are allowed to be steered to a 3GPP RAN or a non-3GPP WLAN and under what conditions the offload is allowed. The rules themselves use information such as channel conditions (e.g. received signal quality), loading at the WLAN, and backhaul quality as triggers as to when to steer bearers of the involved networks. When certain triggers are satisfied, a RAN may allow a UE to move an APN or specific bearers between a 3GPP RAN and a non-3GPP WLAN.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA technique has similar performance and essentially the same overall complexity as those of an OFDMA system. However, an SC-FDMA signal has a lower peak-to-average power ratio (PAPR) because of its inherent single carrier structure. The SC-FDMA technique has drawn great attention, especially in the uplink communications where lower PAPR greatly benefits the mobile terminal in terms of transmit power efficiency. Use of SC-FDMA is currently a working assumption for uplink multiple access scheme in the 3GPP LTE and the Evolved UTRA.

An access point ("AP") may comprise, be implemented as, or known as a NodeB, a Radio Network Controller ("RNC"), an eNodeB, a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple access wireless communication system 100 in which aspects of the present disclosure may be utilized. Wireless communication system 100 may be an LTE or Wi-Fi system, for example.

Wireless communication system 100 may include a base station 102 (BS) that may include multiple antenna groups, one group including antennas 104 and 106, another group including antennas 108 and 110, and an additional group including antennas 112 and 114. In FIG. 1, two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by BS 102.

In communication over forward links 120 and 126, the transmitting antennas of BS 102 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
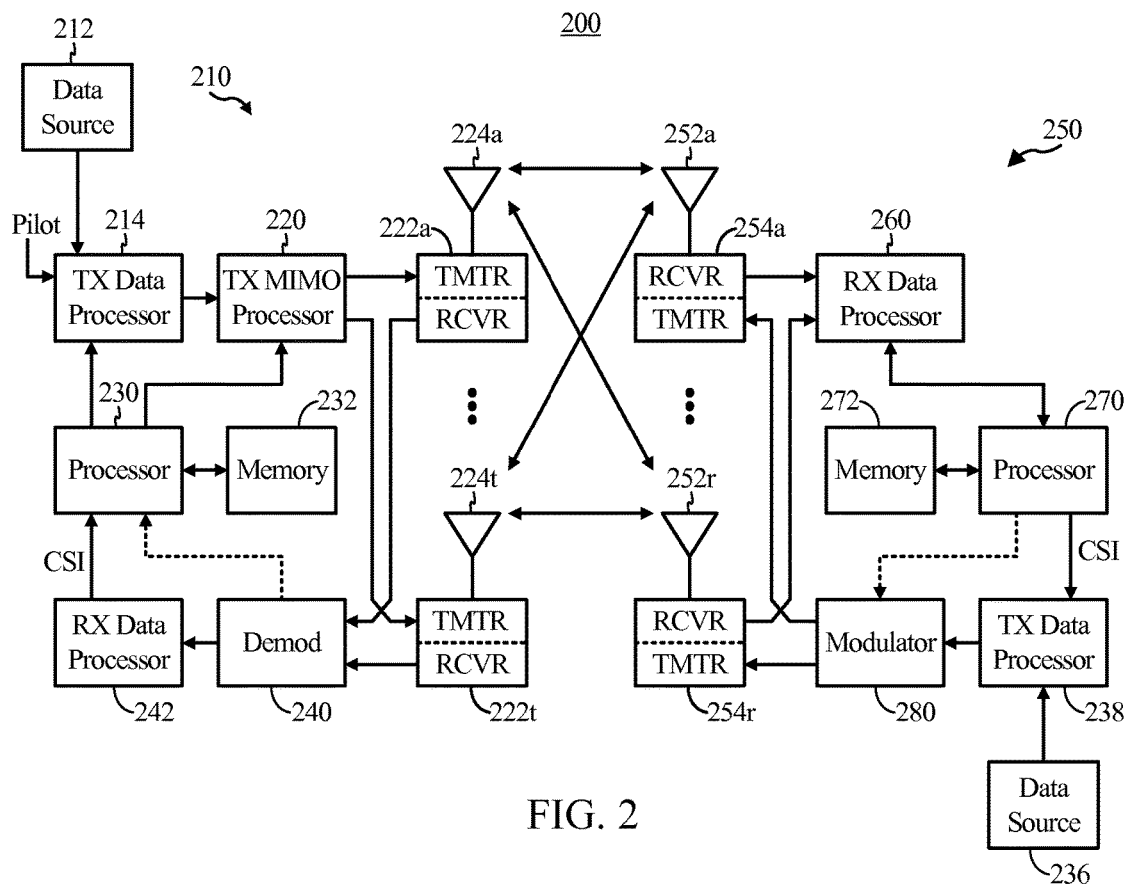
FIG. 2 illustrates a block diagram of an access point and a user terminal in accordance with certain aspects of the present disclosure.

FIG. 2 illustrates a block diagram of a transmitter system 210 (also known as an access point) and a receiver system 250 (also known as an access terminal) in a multiple-input multiple-output (MIMO) system 200. Transmitter system 210 and receiver system 250 may be embodiments of the present disclosure, according to certain aspects. Aspects of the present disclosure may be practiced by transmitter system 210 and receiver system 250. For example, operations 1600 illustrated in FIG. 16 may be performed by transmitter system 210, and operations 1700 illustrated in FIG. 17 may be performed by receiver system 250.

At the transmitter system 210, traffic data for a number of data streams is provided from a data source 212 to a transmit (TX) data processor 214. In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

Figure 17:
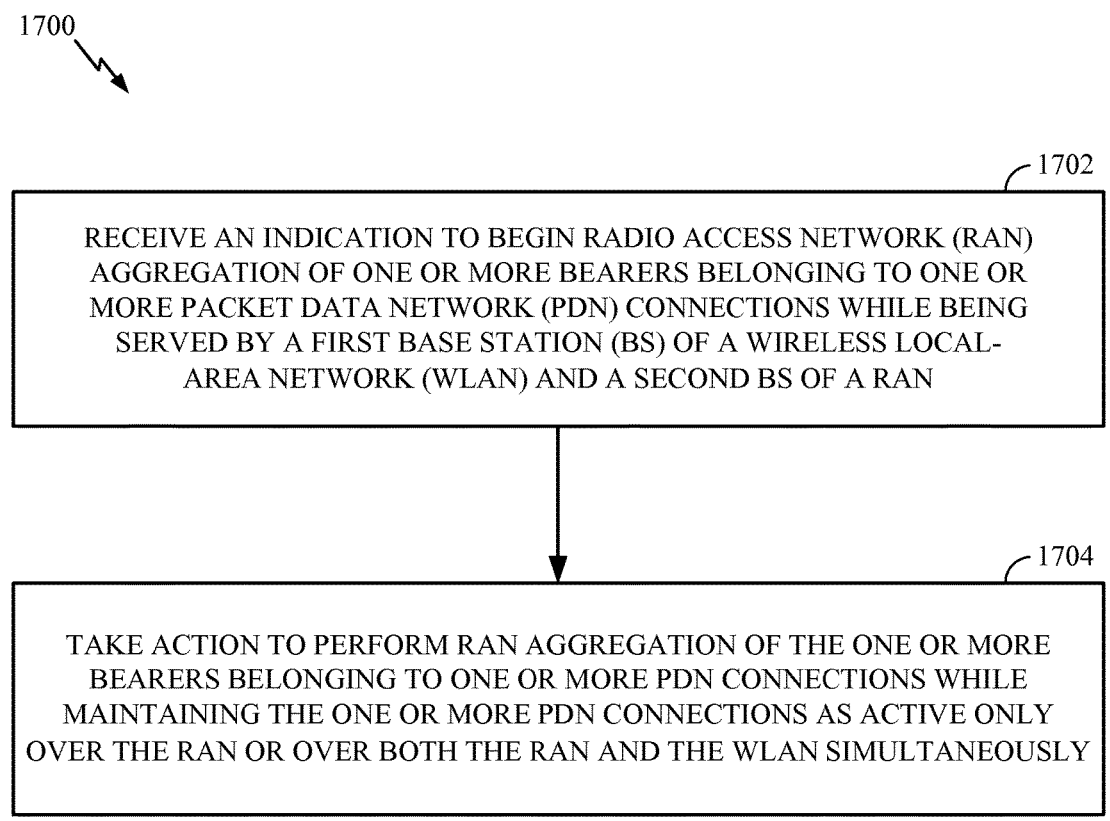
FIG. 17 illustrates example operations for performing RAN aggregation that may be performed by a UE, in accordance with certain aspects of the present disclosure.

One or more of processor 270, RX data processor 260, and TX data processor 238 may direct receiver system 250 in performing operations 1700, illustrated in FIG. 17, according to certain aspects of the present disclosure. Memory 272 may store instructions or code to be executed by the processor, the RX data processor, and the TX data processor when directing the receiver system in performing operations 1700.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 16:
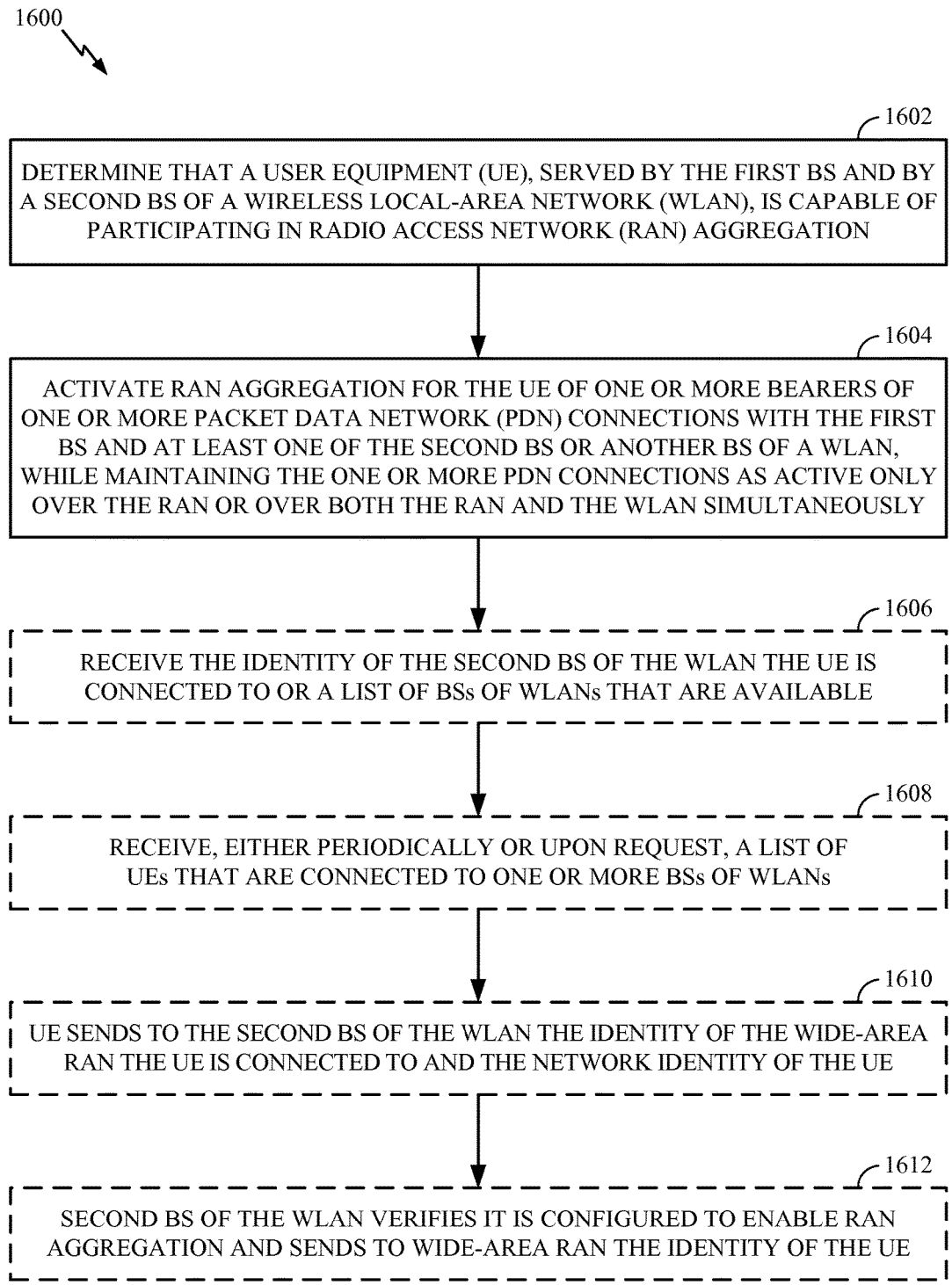
FIG. 16 illustrates example operations for performing RAN aggregation that may be performed by a BS, in accordance with certain aspects of the present disclosure.

One or more of processor 230, RX data processor 242, and TX data processor 214 may direct transmitter system 210 in performing operations 1600, illustrated in FIG. 16, according to certain aspects of the present disclosure. Memory 232 may store instructions or code to be executed by the processor, the RX data processor, and the TX data processor when directing the transmitter system in performing operations 1600.

Figure 3:
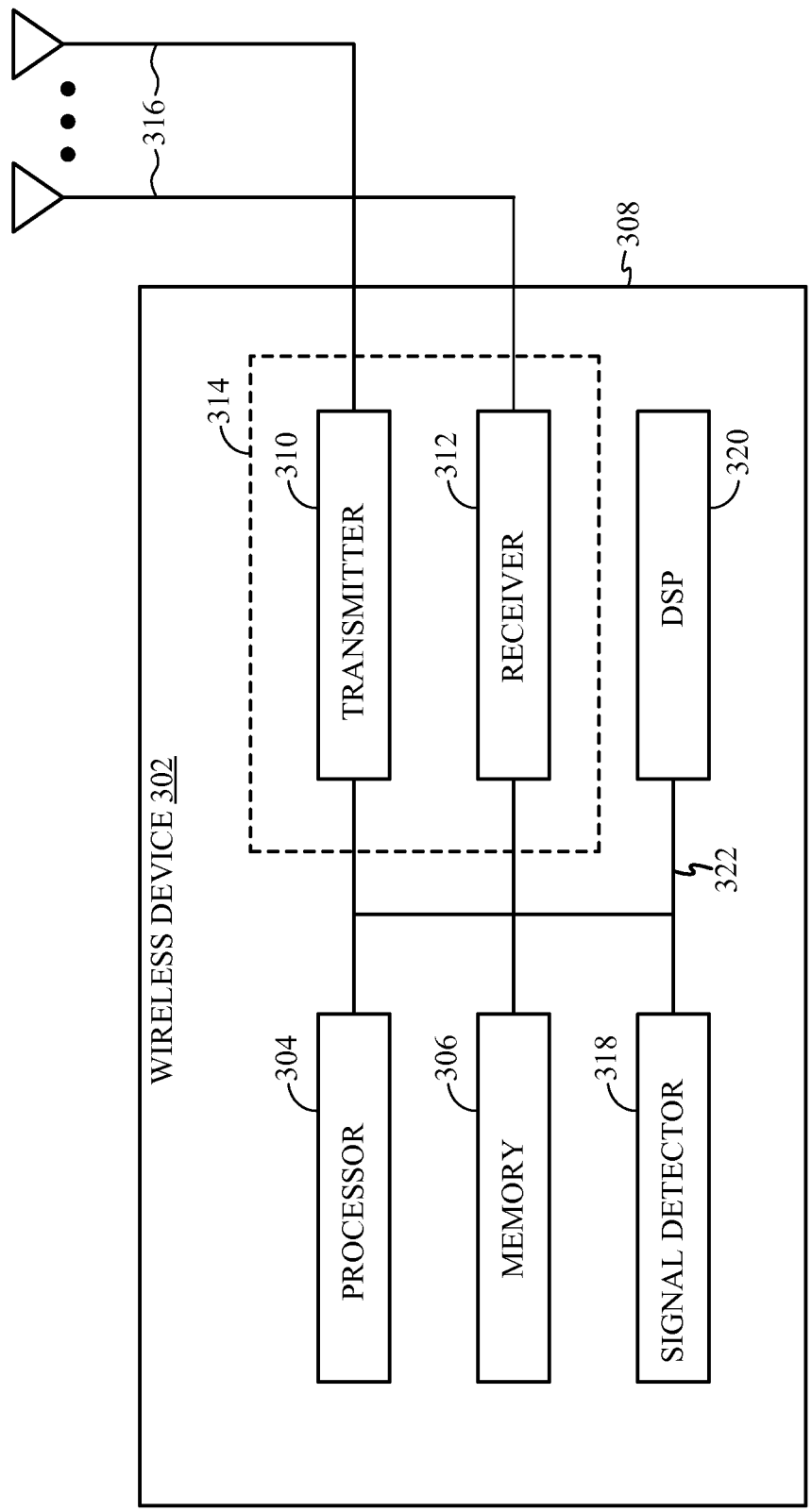
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 102 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
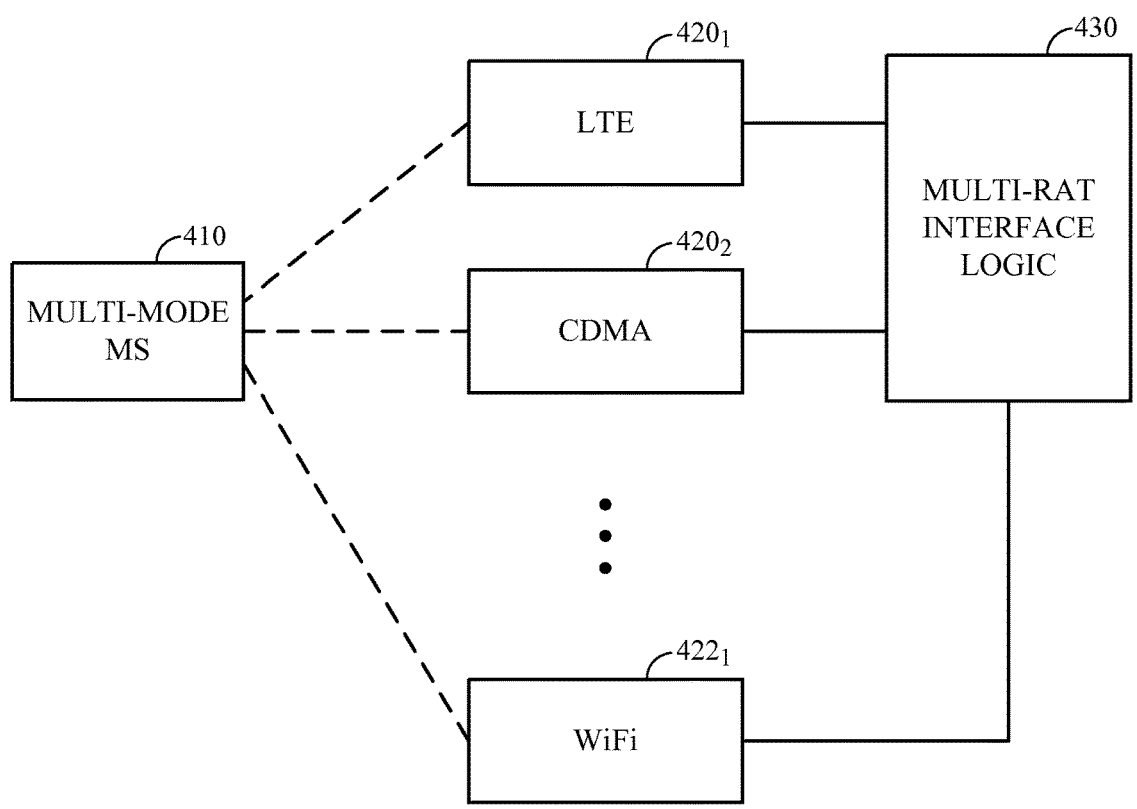
FIG. 4 illustrates an example multi-mode mobile station, in accordance with certain aspects of the present disclosure.

In order to expand the services available to subscribers, some mobile stations (MS) support communications with multiple radio access technologies (RATs). For example, as illustrated in FIG. 4, a multi-mode MS 410 may support LTE for broadband data services and code division multiple access (CDMA) for voice services. Illustratively, LTE is shown as a first RAT $420_1$, CDMA is shown as a second RAT $420_2$, and Wi-Fi is shown as a third RAT $422_1$.

In certain applications, multi-RAT interface logic 430 may be used to exchange information between both wide-area (e.g., long-range) and local-area (e.g., short-range) RATs. This may enable a network provider to control how, e.g., through which RAT, an end user of the multi-mode MS 410 actually connects to the network. The interface logic 430 may support local IP connectivity or IP connectivity to a core network, for example.

For example, a network provider may be able to direct the multi-mode MS to connect to the network via a WLAN (e.g., a Wi-Fi WLAN or other local-area RAT), when available. This capability may allow a network provider to route traffic in a manner that eases congestion of particular air resources. In effect, the network provider may use local-area RATs to distribute some air traffic of a wide-area RAT into a wireline network or to distribute some air traffic from a congested wireless network to a less congested wireless network. The traffic may be re-routed from the local-area RAT when conditions mandate, such as when a mobile user increases speed to a certain level not suitable for a local-area RAT.

Further, since wide-area RATs are typically designed to provide service over several kilometers, the power consumption of transmissions from a multi-mode MS when using a wide-area RAT is non-trivial. In contrast, local-area RATs (e.g., Wi-Fi) are designed to provide service over several hundred meters. Accordingly, utilizing a local-area RAT when available may result in less power consumption by the multi-mode MS 410 and, consequently, longer battery life.

For purposes of clarity, LTE handover and WLAN handover procedures are treated as independent and decoupled in this disclosure, but the disclosed methods and apparatus are not so limited.

According to certain aspects, LTE mobility procedures may be unchanged from previous standards (e.g., Rel-8), except for new WLAN related information exchanged between WLAN APs and eNBs, as described below. WLAN mobility may be UE driven; i.e. a UE may autonomously associate and disassociate with APs and report these association changes to a serving eNB, which may make data traffic routing decisions.

According to certain aspects, a UE may make autonomous decisions for association with an AP and report the association to a serving eNB in an Association Report. The Association Report may include measurements for the AP. For example, a UE may report channel quality of a connection to an AP to a serving eNB.

According to certain aspects, a UE may change APs due to, for example, mobility of the UE from the coverage area of one AP to the coverage area of another AP. For example, a UE associated with an AP serving a building may be carried by a user from inside the building to a patio outside, and the UE may associate with an AP serving the patio once the UE is outside of the building.

Example Interworking Link Layer Traffic Aggregation

As mentioned above, offloading traffic from a cellular network to a WLAN may be desirable, because operator deployed WLANs are often under-utilized. Mobile operators may be able to control which traffic is routed over a WLAN and which traffic is kept on the WWAN (e.g., 3GPP RAN). According to aspects of the present disclosure, whether to switch bearers from a WWAN to a WLAN or vice-versa may be determined based on the main objectives of serving bearers with a "better" link for each bearer, while maximizing a system utility function. According to certain aspects, the better link may be determined based in part on a user's channel conditions, traffic, and other users sharing the same link. For example, some data flows (e.g., related to VoIP or other operators' services) may be served on a WWAN to leverage its QoS capabilities, while data flows related to "best-effort" Internet traffic may be offloaded to a WLAN. This combining of RANs to serve a UE may be referred to as "RAN aggregation." More specifically, RAN aggregation is an approach for offloading traffic between 3GPP access networks like LTE and non-3GPP access networks like Wi-Fi. Inter-working between WWANs (3GPP access networks like LTE) and WLANs (non-3GPP access networks like Wi-Fi) for data offloading can also be enabled by RAN rules. These rules may be either broadcast or sent via dedicated RRC signaling. In addition, non-access stratum (NAS) messages may be used to give supplementary information such as the name of access packet networks (APNs) that are allowed to be steered to a 3GPP RAN or a non-3GPP WLAN and under what conditions the offload is allowed. The rules themselves use information such as channel conditions (e.g. received signal quality), loading at the WLAN, and backhaul quality as triggers as to when to steer bearers. When certain triggers are satisfied, the UE may be allowed to move an APN or specific bearers between a 3GPP RAN and a non-3GPP WLAN.

Throughout the present disclosure, many aspects are discussed in terms of specific radio access technologies (RATs), such as LTE and Wi-Fi, for purposes of clarity. However, the disclosure is not so limited and may apply to aggregation using any suitable combination of RATs. Thus, the term BS may refer to any variety of radio node that serves other devices (e.g., that serves UEs, access terminals, or stations) and may include BSs of long range RANs (i.e. WWAN, e.g., E-UTRAN eNodeBs or UTRAN BSs) or short range RANs (e.g., Wi-Fi APs, femto/pico/micro eNodeBs, unlicensed LTE eNodeBs, etc.).

A UE may become aware of WLAN APs by performing scanning procedures as specified in the Institute of Electrical and Electronic Engineers (IEEE) specification IEEE 802.11, which generally includes passive scanning and active scanning. Passive scanning, e.g. as defined in IEEE 802.11 for Wi-Fi APs, may be inefficient for the UE, as it waits with receiver on for the reception of a WLAN AP beacon. As the beacon transmission interval for Wi-Fi APs is on the order of a hundred milliseconds, this may result in high scan energy and high scan latency with dozens of channels to scan. Active scanning may be faster but adds traffic to the WLAN, e.g. probe requests and probe responses for Wi-Fi. Active scanning is also power intensive.

IEEE 802.11u has defined additional mechanisms for a UE to discover further information about an AP without being associated with the AP. For example, a generic advertisement service (GAS) may transport an advertisement protocol's frames between the UE and a server in the network. The AP may be responsible for relaying a mobile device's query to a server in the carrier's network and for delivering the server's response back to the mobile. Another exemplary mechanism for a UE to discover information about a WLAN AP without being associated with the WLAN AP is a service discovery protocol, e.g. the access network query protocol (ANQP) in case of Wi-Fi, which is generally a query advertisement protocol for access network information retrieval by the UE/STA. ANQP may be transported over the generic advertisement service (GAS) in the case of Wi-Fi. ANQP may include a Hotspot operator's domain name, roaming partners accessible via the Hotspot along with their credential type and extensible authentication protocol (EAP) method supported for authentication, IP address type availability, and other metadata useful in the UE's network selection process.

A UE may not need to associate with a WLAN AP in order to provide measurements regarding the WLAN AP. For example, in case of Wi-Fi the UE may support a subset of additional procedures as defined in IEEE 802.11k, IEEE 802.11u, and Hotspot 2.0. With regards to a radio access network (RAN), there may be no interface between the WLAN AP and the BS. However, for example in the case of a collocated Wi-Fi WLAN AP and BS, IEEE 802.11k, IEEE 802.11u, and Hotspot 2.0 information on the WLAN AP may be known in the BS (e.g., via a backhaul link), and the UE may not be required to perform ANQP to acquire the information. When efficient passive scanning is enabled, a WLAN AP may transmit its beacons at times advertised by the BS on the RAN. In other words, the WLAN AP may acquire cellular timing and SFN, and may know beacon transmission times advertised by the RAN. Two levels of reporting may be used by a UE to identify a WLAN AP: identifying the WLAN AP (e.g., based on a network identifier, such as a service set identifier (SSID) or a basic service set identification (BSSID), Organizational Identifier, supported Service Provider, etc.) directly, i.e., from beacon only, and acquiring IEEE 802.11k, IEEE 802.11u, or Hotspot 2.0 identifying information using ANQP (e.g., in the case of a non-collocated AP and eNB). The network identifier may be used to differentiate one WLAN from another. According to some aspects of the present disclosure, it is possible to have a backhaul interface to exchange this information between a WLAN AP and a BS.

Figure 5:
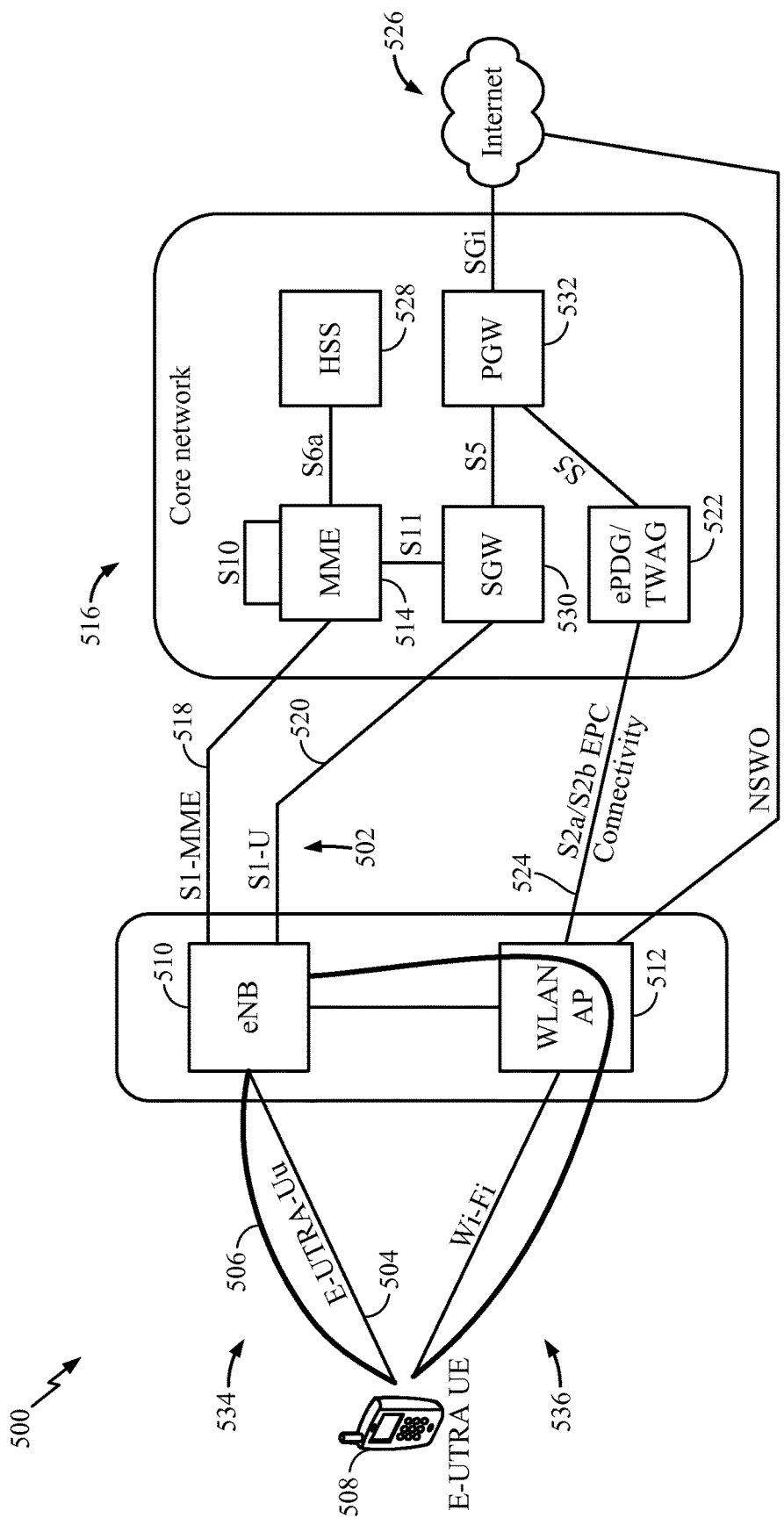
FIG. 5 illustrates a reference cellular-WLAN interworking architecture for a wireless local area network (WLAN) and a 3GPP eNodeB, in accordance with certain aspects of the present disclosure.

FIG. 5 illustrates a reference architecture 500 for WLAN to wide-area radio access network (RAN) aggregation using separate evolved packet system (EPS) bearers 534, 536 terminating at the RAN over an S1 interface 502. Access to PDN services and associated applications is provided to a UE 508 by EPS bearers. A Default Bearer 504 is typically established during attachment and maintained throughout the lifetime of the PDN connection. As a result of service requests or access to services, additional Dedicated Bearers 506 can be dynamically established. The architecture in FIG. 5 is one embodiment of RAN aggregation functionality between 3GPP access networks like LTE or high speed packet access (HSPA) and non-3GPP access networks like WLAN systems. This permits use of a WLAN access service by 3GPP subscribers. The UE in FIG. 5 has a single WLAN interface (e.g., a transceiver capable of WLAN communications).

As illustrated in FIG. 5, a UE may be served by an eNB 510 or other BS, via a wide-area wireless (e.g., LTE, UTRAN, GERAN, etc.) network, and by a WLAN AP 512 or other BS, via a local-area wireless (e.g., Wi-Fi) network. While FIG. 5 shows an eNB, the BS of the wide-area network may be a UTRAN NodeB, an E-UTRAN eNodeB, an access point, or any other radio node supporting a wide-area wireless network. Similarly, the BS of the local-area network may be a low-power E-UTRAN eNodeB such as a femto node, a WLAN AP, or any other radio node supporting a local-area wireless network.

According to aspects of the present disclosure, the BS of the wide-area network may communicate with a mobility management entity (MME) 514 in the core network (i.e., EPC) 516 via an S1-MME interface 518, and with a serving gateway (SGW) via an S1-U interface 520. The BS of the local-area network may communicate with an evolved packet data gateway (ePDG) or trusted wireless access gateway (TWAG) 522 in the core network via S2a and/or S2b interfaces 524. The BS of the local-area network may also communicate directly with Internet entities 526 to provide non-seamless WLAN offload (NSWO) of internet protocol (IP) traffic between the UE and the Internet entities. NSWO may be used by a UE to support routing specific IP flows over the WLAN access network without traversing the EPC. Also, one or more entities included in the evolved packet core (EPC) support an access network discovery and selection function (ANDSF), which assists UEs to discover non-3GPP access networks, such as Wi-Fi networks. ANDSF may be used for controlling offloading between 3GPP access networks (such as LTE) and non-3GPP access networks (such as Wi-Fi). ANDSF also provides the UE with rules regarding connections to these networks. The MME may communicate with a home subscriber server (HSS) 528 via an S6a interface, and with the serving gateway (SGW) 530 via an S11 interface. One or more MMEs 514 may communicate with each other via an S10 interface. The SGW, ePDG, and TWAG may communicate with a packet gateway (PGW) 532 via an S5 interface. The PGW may communicate with Internet entities via an SGi interface.

According to aspects of the present disclosure, with RAN aggregation a UE may be simultaneously connected to an LTE eNB and a WLAN AP (e.g., a Wi-Fi AP), which provide radio access links to transport a user's signaling and data traffic, as shown in FIG. 5. The eNB and the AP may be logically collocated or non-collocated. A user's data or signaling bearers may be served by either LTE or Wi-Fi radio links. A data bearer establishes a "virtual" connection between two endpoints so that traffic can be sent between them. A data bearer acts as a pipeline for data between the two endpoints. According to aspects of the present disclosure, methods are described for enabling and controlling interworking and data bearer offloading between LTE and Wi-Fi. With interworking, the performance of each of the available links may be autonomously evaluated (e.g., by an eNB or MME) on a real-time basis, without any user intervention, and the "best possible" link for each data bearer may be selected. The performance evaluation may look at a multitude of parameters from an end-to-end perspective. Some of the parameters considered for the decision may include signal and channel quality on the WWAN and WLAN links, available bandwidth, latency, and operator policies regarding which applications and services may be moved to Wi-Fi and which are restricted to 3GPP RAN.

Figure 6:
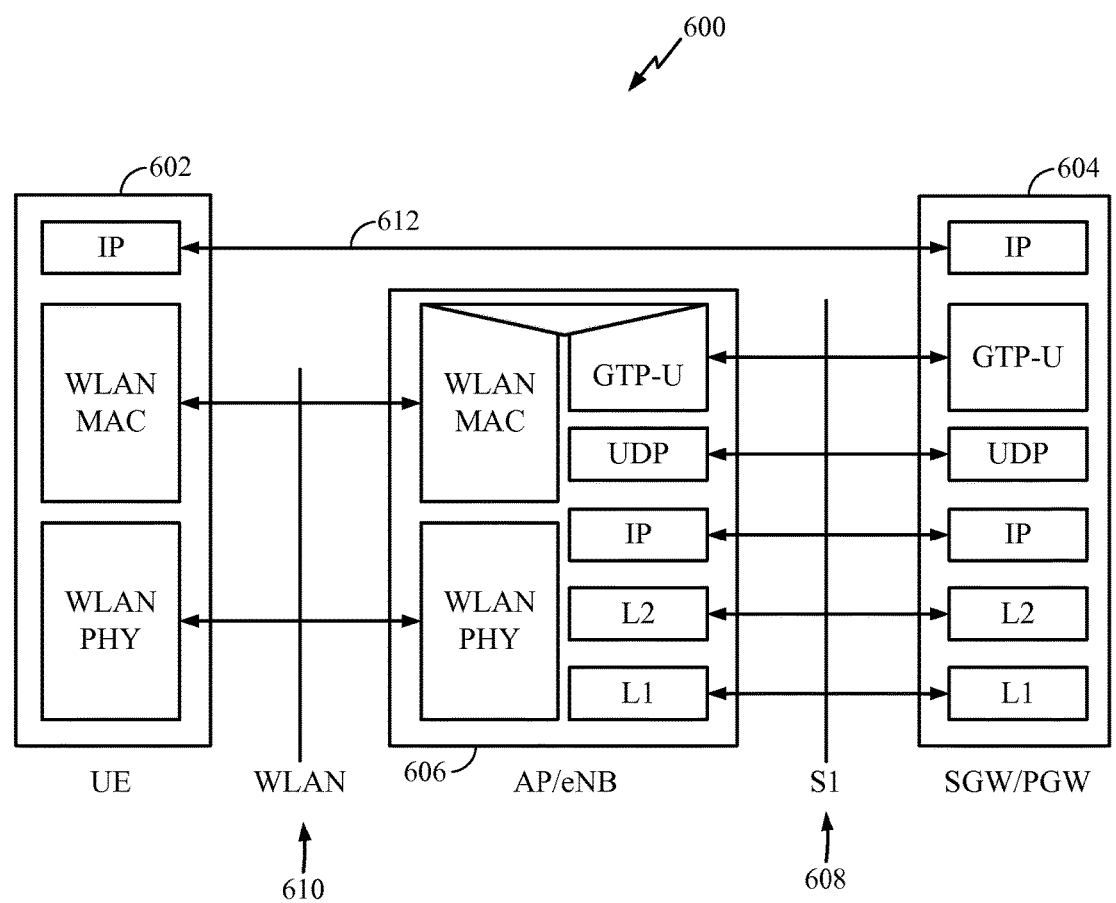
FIG. 6 illustrates an exemplary interface protocol architecture for the user plane, in accordance with certain aspects of the present disclosure.

FIG. 6 illustrates an exemplary user plane 600 between a UE 602 and a RAN entity (e.g., a PGW or SGW) 604 for WLAN (e.g., Wi-Fi, LTE-U, etc.) to wide-area RAN (e.g., LTE, UTRAN, GERAN) aggregation using separate EPS bearers terminating at a RAN entity (e.g., a PGW or SGW), i.e., the UE transmits or receives packets on the bearers via a WLAN BS (e.g., a Wi-Fi AP or pico eNB) 606. In the exemplary user plane, an AP or eNB may share a context through one or more S1 interfaces 608 with an SGW or a PGW at a generic packet radio service tunneling protocol user data tunneling (GTP-U) layer, a user datagram protocol (UDP) layer, an IP layer, a layer two (L2) or media access control (MAC) layer, and a layer 1 (L1) or physical layer.

The UE may share a context through a WLAN interface 610 with the AP or eNB at a WLAN MAC layer and a WLAN physical (PHY) layer. The UE and the PGW may share a context at an upper IP layer via an EPS bearer 612 that is independent of any EPS bearers that may be established between the UE and RAN entities via the UE's serving macro eNB.

A radio link control (RLC) packet may indicate an associated EPS bearer in the MAC header of the packet in some releases (e.g., Rel-8) of LTE. As such, for both bearer and packet aggregation in WLAN, a UE and the UE's serving BS may indicate the logical channel (LC) ID for the appropriate EPS bearer in the WLAN MAC header of each packet, if more than one bearer is being served by the WLAN. Logical channel IDs (LCIDs) are used to map data radio bearers (DRBs) to EPS bearers at the MAC layer. A radio bearer is specified by each LCID to enable a UE and the UE's serving BS to provide services to a user at an appropriate quality of service (QoS) at the radio protocol level. That is, a UE and the UE's serving BS read an LCID from a radio packet, determine the EPS bearer based on the LCID, determine the QoS for that EPS bearer, and then prioritize the further handling of the data from the radio packet based on the determined QoS.

According to certain aspects of the present disclosure, an existing field of a WLAN MAC header of a packet may be used to indicate an LCID of the packet. For example, a UE and the UE's serving BS can use a virtual LAN (VLAN) tag in a packet's WLAN MAC header to indicate the associated bearer of the packet.

Figure 7:
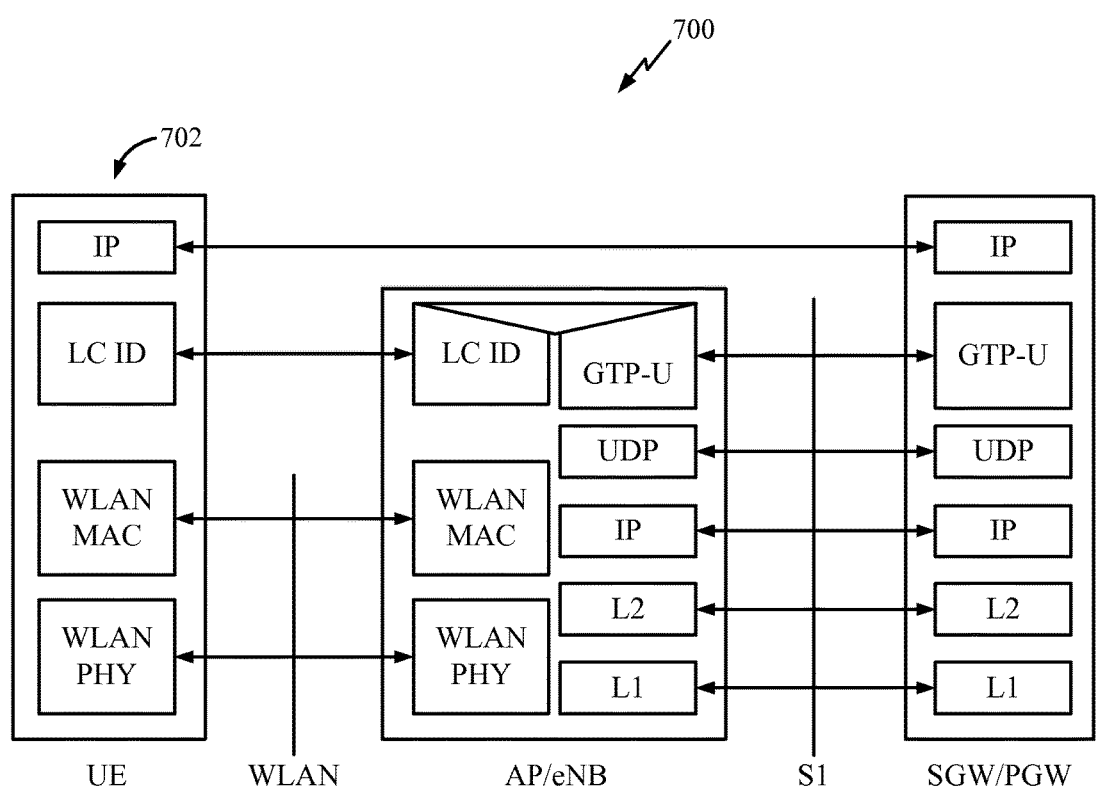
FIG. 7 illustrates an exemplary interface protocol architecture for the user plane, in accordance with certain aspects of the present disclosure.

FIG. 7 illustrates an exemplary user plane 700 between a UE and a RAN entity (e.g., a PGW or SGW) for WLAN (e.g., Wi-Fi, LTE-U, etc.) to wide-area RAN (e.g., LTE, UTRAN, GERAN) aggregation using separate EPS bearers terminating at the RAN entity (e.g., a PGW or SGW), with an additional LCID layer 702 to identify the EPS bearer to both the UE and the AP or eNB, as described above. The entities and other layers of exemplary user plane 700 are similar to those in exemplary user plane 600, described above with reference to FIG. 6.

According to certain aspects of the present disclosure, an additional header may be sent over the WLAN to identify the EPS bearer of an associated packet, as shown in FIG. 7. For example, a UE and an AP may include an additional header in packets of a bearer, such as a generic routing encapsulation (GRE) header, to indicate the associated bearer. As illustrated in FIG. 7, the UE and AP or eNB may share a context for the LCID at a layer above the WLAN MAC layer.

A UE can connect to an EPC network over WLAN using at least two types of Wi-Fi access, untrusted or trusted access. According to aspects of the present disclosure, a UE may connect to a 3GPP evolved packet core (EPC) network over an untrusted (i.e., untrusted by the 3GPP EPC network) WLAN by connecting to an ePDG via an S2b interface (see FIG. 5). The UE may connect to the ePDG using an Internet Protocol Security (IPSec) connection over the S2b interface. The ePDG may connect to a PDN gateway using a secure tunnel created by a Proxy Mobile Internet Protocol (PMIP) or a general packet radio service (GPRS) Tunneling Protocol (GTP) over an S5 interface. A UE may need to associate with a WLAN AP and have access to Internet connectivity in order to establish connectivity to an ePDG. Evolved Packet Data Gateway (ePDG) is part of the network functions of the 4G mobile core network, also referred to as the evolved packet core (EPC). The ePDG is responsible for secure interworking between an untrusted non-3GPP network, such as a Wi-Fi, and the EPC.

According to aspects of the present disclosure, a UE may connect to a 3GPP evolved packet core (EPC) network over a trusted (i.e., trusted by the 3GPP EPC network) WLAN by connecting to a TWAG via an S2a interface (see FIG. 5). With trusted access, there is a secure connection with respect to authentication and data protection between the EPC and the WLAN. The UE may connect to the TWAG over the S2a interface if the UE associates to an AP that supports S2a connectivity. The TWAG may connect to a PDN gateway using Proxy Mobile Internet Protocol (PMIP) or GPRS Tunneling Protocol (GTP) over an S5 interface. A UE that associates with a WLAN AP that supports S2a may also obtain NSWO services from the WLAN AP.

Figure 8:
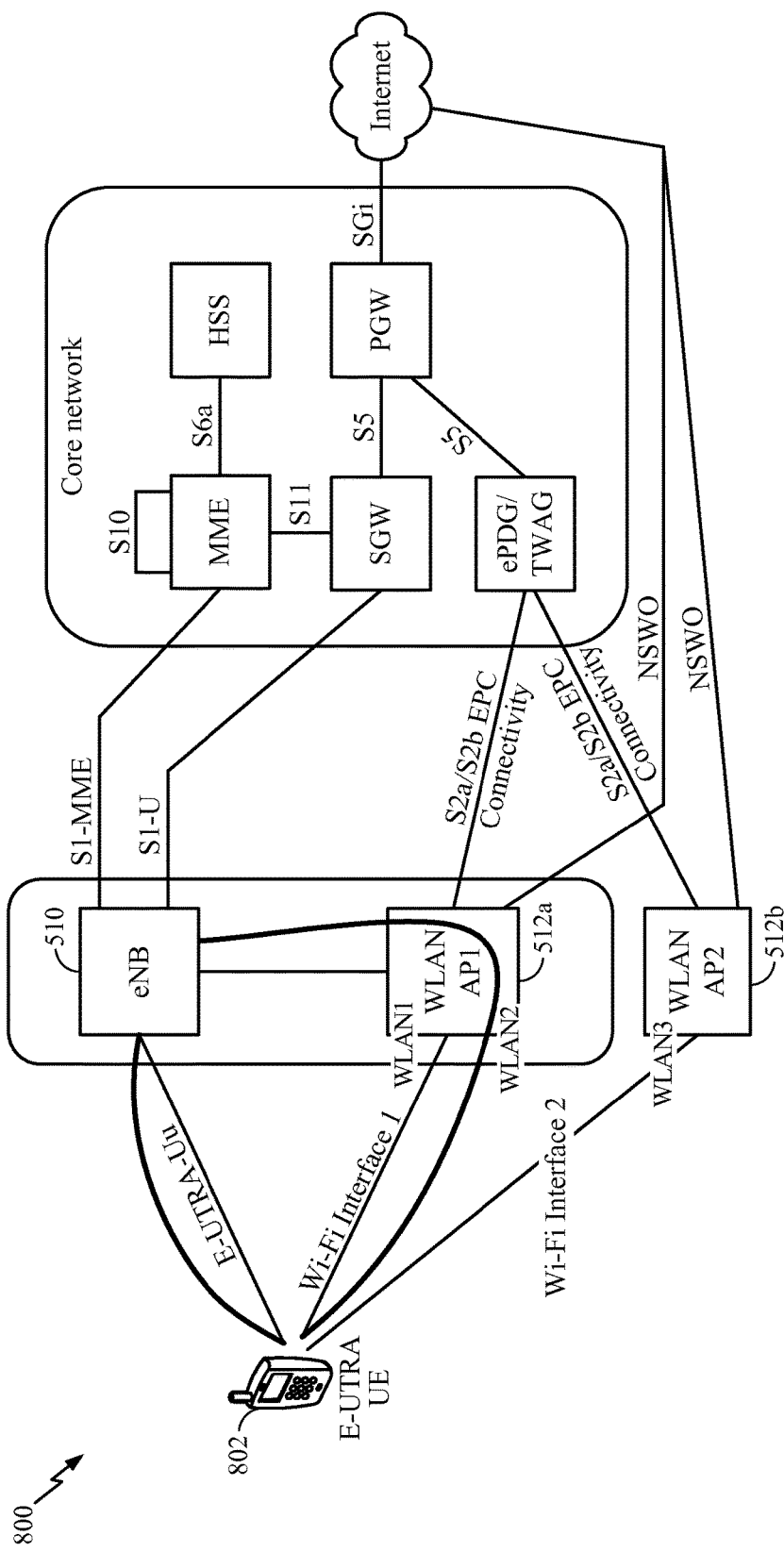
FIG. 8 illustrates a reference architecture for WLAN to wide-area radio access network (RAN) aggregation, in accordance with certain aspects of the present disclosure.

FIG. 8 illustrates a reference architecture 800 for WLAN to wide-area radio access network (RAN) aggregation using separate evolved packet system (EPS) bearers terminating at the RAN over an S1 interface, according to aspects of the present disclosure. The architecture in FIG. 8 is one embodiment of RAN aggregation functionality between 3GPP and WLAN systems. RAN aggregation permits use of a WLAN access service by 3GPP subscribers. The architecture illustrated in FIG. 8 is similar to the architecture 500 illustrated in FIG. 5, with the differences that the UE 802 in FIG. 8 has two WLAN interfaces (e.g., two transceivers capable of WLAN communications) and there are two WLAN APs 512a, 512b in range of the UE.

According to aspects of the present disclosure, a user may be simultaneously connected to an LTE eNB and two Wi-Fi (i.e., Wi-Fi) APs, which provide radio access links to transport a user's signaling and data traffic, as shown in FIG. 8. The eNB and the APs may be logically collocated or non-collocated. A user's data or signaling bearers may be served by either LTE or Wi-Fi radio links. A UE and WLAN BS may have more than one type of connectivity, with each type of connectivity established for separate purposes. For example, and as illustrated in FIG. 8, a UE may establish first connectivity WLAN1 to a WLAN AP 512a for bearers that are being RLC aggregated, and the UE may establish second connectivity WLAN2 to the WLAN AP for bearers that are being served by NSWO services provided by the WLAN AP and/or bearers that are being conveyed to the EPC by an S2a or S2b interface. As described above with reference to FIG. 7, the UE and the WLAN AP may differentiate the first connectivity and second connectivity by including LCIDs in the radio packets used for the first connectivity and second connectivity.

According to aspects of the present disclosure, a UE may have established wireless local-area network connectivity with one or more WLAN APs or other BSs of local-area networks that would allow the UE to benefit from RAN aggregation. According to aspects of the present disclosure, mechanisms for the network to determine that RAN aggregation can be initiated, to establish RAN aggregation, and for the UE to maintain the set of PDN connections active over WLAN are disclosed. According to these aspects, the triggering of RAN aggregation may not impact existing PDN connections over WLAN.

According to aspects of the present disclosure, a serving wide-area RAN (e.g., E-UTRAN UTRAN, or GERAN) may discover that a served UE is also being served by a wireless local-area network, e.g., a wide-area RAN may determine that a served UE has WLAN (e.g., Wi-Fi or LTE-U) connectivity.

According to aspects of the present disclosure, a UE may send to the UE's serving wide-area RAN entities (e.g., an eNB or MME) the identity of a WLAN AP the UE is connected to or a list of WLAN APs that are available. The UE may also indicate what traffic, if any, is being sent over WLAN, e.g., by indicating served bearers or access point names (APNs), or an indication that the UE is using NSWO, S2b, or S2a connections. According to aspects of the present disclosure, the UE may send an indication of whether the WLAN traffic is allowed to use RAN aggregation with the wide-area RAN or even be sent over the wide-area RAN. For example, the UE may inform the RAN that the traffic is streaming video from Netflix and that the traffic cannot be sent over cellular, which, in effect, says this traffic cannot be aggregated.

According to aspects of the present disclosure, an AP of a wireless local-area network (e.g., a Wi-Fi AP, a femto/pico/micro node, etc.) that is configured to enable RAN aggregation with a specific BS or access controller for one or more APs may send, either periodically or upon request from a wide-area RAN entity, a list of the UEs that are connected to the one or more WLAN APs.

According to aspects of the present disclosure, a UE may send to a serving WLAN AP (e.g., a Wi-Fi AP, a femto/pico/micro node, etc.) the identity of the UE's serving wide-area RAN (e.g. PLMN, Cell ID, etc.) and the cellular identity of the UE. The WLAN AP, upon receiving such information, may verify that the WLAN AP is configured to enable RAN aggregation with the wide-area RAN serving the UE (e.g., verifying the PLMN ID, the cell ID, etc.) and may send an indication to the wide-area RAN providing the identity of the UE that the UE has sent to the WLAN AP.

According to aspects of the present disclosure, a wide-area RAN may be configured with the identities of WLAN APs (e.g., Wi-Fi APs, femto/pico/micro nodes, etc.) that can be used for RAN aggregation for a specific UE (e.g. based on the identity of the wide-area RAN cell that the UE is connected to). In some cases, a WLAN AP may use separate identities (e.g., network identifiers or service set identifiers (SSIDs)) for RAN aggregation and normal (e.g., Wi-Fi without RAN aggregation) service. According to these aspects, the wide-area RAN (i.e., one or more RAN entities) may be aware of the separate identities, and the wide-area RAN may be informed (e.g., by an indication transmitted by the UE) that the UE is connected to one of the APs in the list of APs that can be used for RAN aggregation.

According to aspects of the present disclosure, a wide-area RAN entity (e.g., an eNB or MME) may trigger RAN aggregation for a served UE based on the wide-area RAN entity (e.g., an eNB or MME) obtaining an indication that the served UE is connected to a WLAN BS (e.g., a Wi-Fi AP, a femto/pico/micro node, etc.) that allows RAN aggregation.

Figure 9:
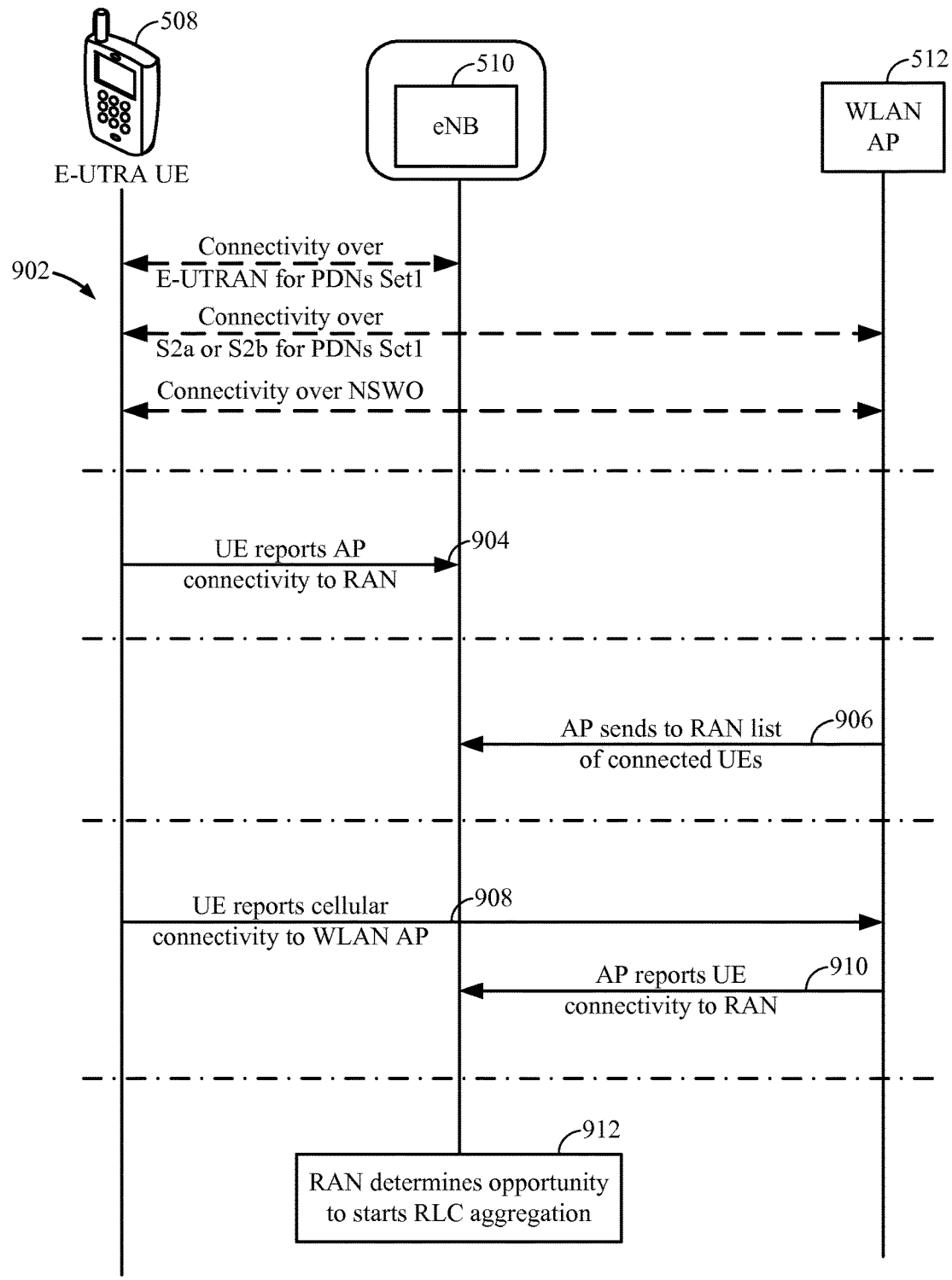
FIG. 9 illustrates exemplary call flows to trigger RAN aggregation, in accordance with certain aspects of the present disclosure.

FIG. 9 illustrates an exemplary call flow for a wide-area RAN to trigger RAN aggregation for a served UE. At 902, a UE 508 may connect to a wide-area RAN BS (e.g., an eNB) 510 and a WLAN AP (e.g., a Wi-Fi AP, a femto/pico/micro node, etc.) 512. The connection to the WLAN AP may be used for an S2a connection, an S2b connection, an NSWO connection, or any combination of connections, as described above with reference to FIG. 5. In a first aspect of the disclosure, at 904 the UE may report to the wide-area RAN BS that the UE is connected to the WLAN AP. In a second aspect of the disclosure, at 906 the WLAN AP may send to the wide-area RAN a list of connected UEs. In a third aspect of the disclosure, at 908 the UE may report its connection to the wide-area RAN to the WLAN AP. At 910, the WLAN AP may report to the wide-area RAN that the UE is connected to the WLAN AP. Based on the one or more reports the wide-area RAN receives at 904, 906, and 910, the wide-area RAN may determine to start RLC aggregation at 912.

According to aspects of the present disclosure, a device connected with IP flow mobility (IFOM) active for at least one PDN connection (i.e. some IP flows of a PDN are over cellular and some are over WLAN, whether UE-based IFOM or network based IFOM (NB-IFOM)), if multiple aspects 904, 906, 908, and 910 are used, then a wide-area RAN BS (e.g., an eNB) could receive multiple sets of information regarding a UE's connections to WLAN APs. According to these aspects, the wide-area RAN BS may compare the received sets of information and select the WLAN AP or set of WLAN APs that is contained in multiple sets of information to participate in RAN aggregation.

According to aspects of the present disclosure, a wide-area RAN entity may trigger RAN aggregation at a non-access stratum (NAS) level. The non-access stratum (NAS) is used for the control plane and conveys non-radio signaling between the Mobility Management Entity (MME) of the core network (CN) and the UE for LTE or E-UTRAN access. According to these aspects, a wide-area RAN entity, upon determining that RAN aggregation is possible and may begin, may send an indication of this to an MME or SGSN. Upon receiving the indication, and based on information of which APNs can be offloaded to a WLAN, the MME or SGSN may determine to start RAN aggregation. The MME may then send a NAS message to the UE to trigger RAN aggregation.

According to certain aspects of the present disclosure, a UE may trigger RAN aggregation at a non-access stratum (NAS) level. According to these aspects, a UE may send to an MME or SGSN, via NAS signaling, an identity of a WLAN AP (e.g., a Wi-Fi AP, a femto/pico/micro node, etc.) that the UE is connected to or a list of WLAN APs that are available. The UE may also indicate what traffic is being sent over WLAN, e.g., bearers or APNs, or an indication that the UE is using NSWO, S2b, or S2a connections. The UE may also send an indication of whether the traffic is allowed to use RAN aggregation or to be sent over the wide-area RAN. Upon receiving such information (e.g., WLAN AP identity, WLAN traffic, whether traffic may use RAN aggregation, etc.), and based on information of which APNs can be offloaded to WLAN, the MME or SGSN may determine to start RAN aggregation. Information of which APNs can be offloaded to WLAN may be provided to the UE by the MME or SGSN upon PDN connection establishment by the MME or SGSN. The MME may then send a NAS message triggering RAN aggregation to the UE. Moving the decision to RAN aggregate to the MME may reduce conflict.

FIGS. 10A and 10B illustrate an exemplary wireless communication system 1000 in which RAN aggregation may be used. FIG. 10A illustrates an exemplary UE 508, wide-area RAN BS (e.g., an eNB) 510, WLAN AP (e.g., a Wi-Fi AP, a femto/pico/micro node, etc.) 512, core network, and Internet before starting RAN aggregation. As illustrated, the UE is connected to the wide-area RAN for a first set of PDNs, and connected to the WLAN AP for a second set of PDNs or NSWO or both. FIG. 10B illustrates the same UE, wide-area RAN BS, WLAN AP, core network, and Internet after RAN aggregation has begun. The UE is connected to the wide-area RAN for a first set of PDNs, some using RAN aggregation, and connected to the wide-area RAN via the WLAN AP for a second set of PDNs.

Figure 11:
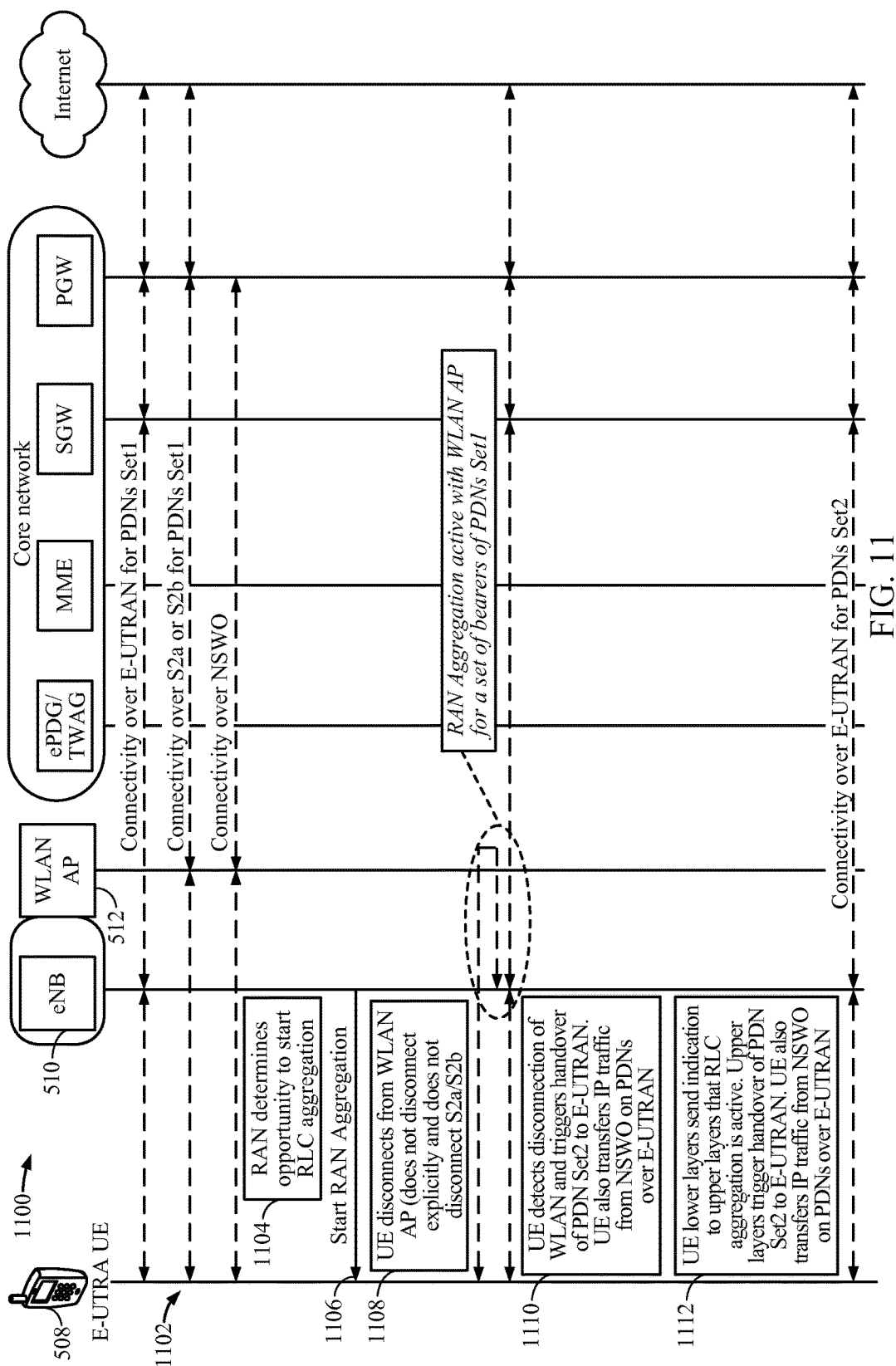
FIG. 11 illustrates an exemplary call flow for triggering RAN aggregation, in accordance with certain aspects of the present disclosure.

FIG. 11 illustrates an exemplary call flow 1100 for triggering of RAN aggregation and traffic mobility for a UE 508 having a single WLAN connection. The illustrated call flow may be used by the UE, eNB, AP, and core network entities illustrated in FIG. 10A to start the RAN aggregation illustrated in FIG. 10B. At 1102, a UE may connect to a wide-area RAN BS (e.g., an eNB) 510 for PDN Set 1 and connect to a WLAN AP (e.g., a Wi-Fi AP, a femto/pico/micro node, etc.) 512. The connection to the WLAN AP may be used for PDN Set 1 on an S2a connection or an S2b connection, for an NSWO connection, or for any combination of connections. At 1104, the wide-area RAN may determine to start RLC aggregation. At 1106, the wide-area RAN BS may send a command to the UE to start RAN aggregation. At 1108 the UE may disconnect from the WLAN AP without sending an explicit disconnect notification to the WLAN AP and without disconnecting any S2a and S2b connections the UE has to the ePDG or TWAG. In a first aspect of the disclosure, at 1110, the UE may detect disconnection of the WLAN AP and trigger handover of PDN Set 2 to the wide-area RAN. The UE may also transfer IP traffic from NSWO to PDNs transported over the wide-area RAN at 1110. In a second aspect of the disclosure, at 1112, lower layers of the UE's network software stack may send an indication to upper layers of the UE's network software stack that RLC aggregation is active. The upper layers of the UE's network software stack may trigger handover of PDN Set 2 to the wide-area RAN at 1112. The UE may also transfer IP traffic from NSWO to PDNs on the wide-area RAN at 1112.

FIGS. 12A and 12B illustrate an exemplary wireless communication system 1200 in which RAN aggregation may be used. FIG. 12A illustrates an exemplary UE 508, wide-area RAN BS (e.g., an eNB) 510, a WLAN AP1 (e.g., a Wi-Fi AP, a femto/pico/micro node, etc.) 512*a* which can participate in RAN aggregation, a WLAN AP2 (e.g., a Wi-Fi AP, a femto/pico/micro node, etc.) 512*c* that cannot participate in RAN aggregation, a core network, and the Internet before starting RAN aggregation. As illustrated, the UE is connected to the wide-area RAN for a first set of PDNs and connected to the WLAN AP2 for a second set of PDNs or NSWO or both. FIG. 12B illustrates the same UE, wide-area RAN BS, WLAN AN, WLAN AP2, core network, and the Internet after RAN aggregation has begun. The UE is connected to the wide-area RAN for a first set of PDNs, some using RAN aggregation, and connected to the wide-area RAN via WLAN AP1 for a second set of PDNs.

Figure 13:
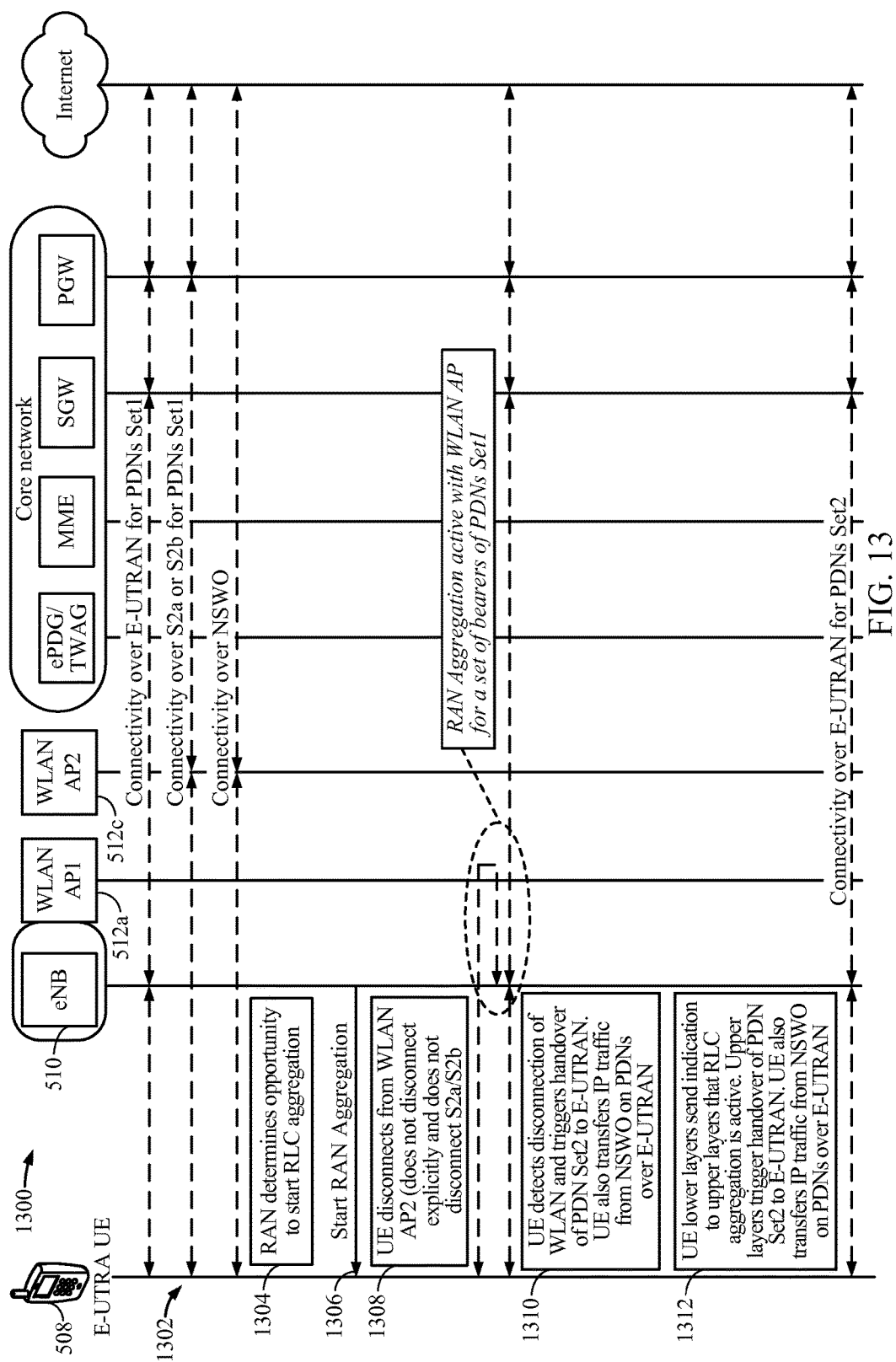
FIG. 13 illustrates an exemplary call flow for triggering of RAN aggregation, in accordance with certain aspects of the present disclosure.

FIG. 13 illustrates an exemplary call flow 1300 for triggering of RAN aggregation and traffic mobility for a UE 508 having a single WLAN connection that changes its WLAN connection from a first WLAN AP2 (e.g., a Wi-Fi AP, a femto/pico/micro node, etc.) 512*c* that cannot participate in RAN aggregation, to a second WLAN AP1 (e.g., a Wi-Fi AP, a femto/pico/micro node, etc.) 512*a* that can participate in RAN aggregation. The illustrated call flow may be used by the UE, eNB, AP, and core network entities illustrated in FIG. 12A to start the RAN aggregation illustrated in FIG. 12B. At 1302, a UE may connect to a wide-area RAN BS (e.g., an eNB) for PDN Set 1 and connect to AP2. The connection to AP2 may be used for PDN Set 1 on an S2a connection or an S2b connection, for an NSWO connection, or for any combination of connections. At 1304, the wide-area RAN may determine to start RLC aggregation. At 1306, the wide-area RAN BS may send a command to the UE to start RAN aggregation with AP1. At 1308, the UE may disconnect from AP2 without sending an explicit disconnect notification to AP2 and without disconnecting any S2a and S2b connections the UE has to an ePDG or TWAG. In a first aspect of the disclosure, at 1310, the UE may detect disconnection of the AP2 and trigger handover of PDN Set 2 to the wide-area RAN. The UE may also transfer IP traffic from NSWO to PDNs transported over the wide-area RAN at 1310. In a second aspect of the disclosure, at 1312, lower layers of the UE's network software stack may send an indication to upper layers of the UE's network software stack that RLC aggregation is active. The upper layers of the UE's network software stack may trigger handover of PDN Set 2 to the wide-area RAN at 1312. The UE may also transfer IP traffic from NSWO to PDNs on the wide-area RAN at 1312.

FIGS. 14A and 14B illustrate an exemplary wireless communication system 1400 in which RAN aggregation may be used. FIG. 14A illustrates an exemplary UE 802 capable of simultaneously connecting to two WLANs, a wide-area RAN BS (e.g., an eNB), a WLAN AP1 (e.g., a Wi-Fi AP, a femto/pico/micro node, etc.) 512*a* that can participate in RAN aggregation, a WLAN AP2 (e.g., a Wi-Fi AP, a femto/pico/micro node, etc.) 512*b* that cannot participate in RAN aggregation, a core network, and the Internet before starting RAN aggregation. As illustrated, the UE is connected to the wide-area RAN for a first set of PDNs and connected to AP2 for a second set of PDNs or NSWO or both. FIG. 14B illustrates the same UE, wide-area RAN BS, AP1, AP2, core network, and the Internet after RAN aggregation has begun. The UE is connected to the wide-area RAN for a first set of PDNs and bearers moved from WLAN, some using RAN aggregation, connected to the wide-area RAN via AP1 for a second set of PDNs, and connected to the wide-area RAN via AP2 for a third set of PDNs.

Figure 15:
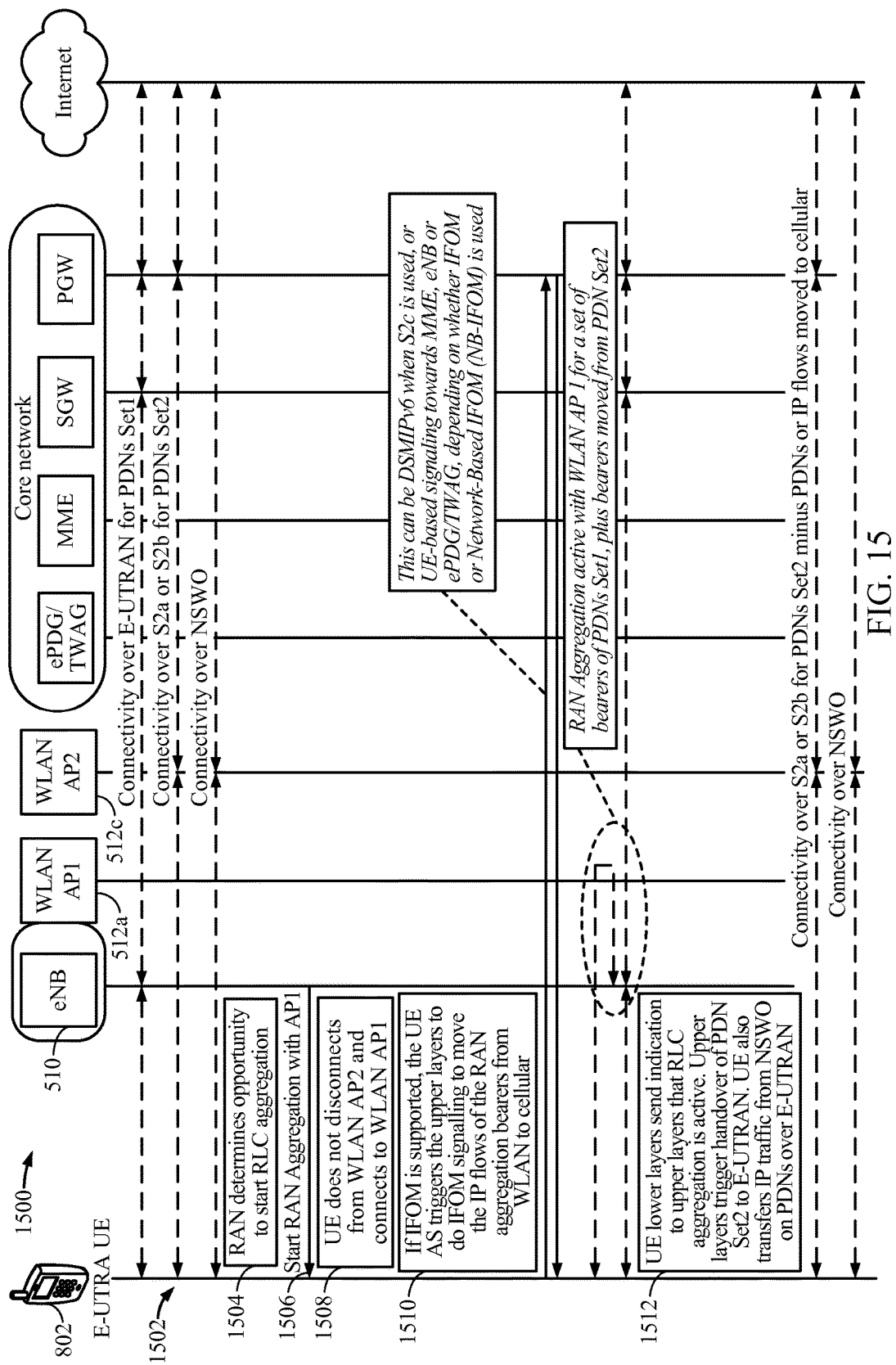
FIG. 15 illustrates an exemplary call flow for triggering of RAN aggregation, in accordance with certain aspects of the present disclosure.

FIG. 15 illustrates an exemplary call flow 1500 for triggering of RAN aggregation and traffic mobility for a UE 802 capable of simultaneously connecting to two WLANs that is connected to a first WLAN AP2 (e.g., a Wi-Fi AP, a femto/pico/micro node, etc.) 512*c* that cannot participate in RAN aggregation. The illustrated call flow may be used by the UE, eNB, AP, and core network entities illustrated in FIG. 14A to start the RAN aggregation illustrated in FIG. 14B. At 1502, a UE may connect to a wide-area RAN BS (e.g., an eNB) for PDN Set 1 and connect to AP2. The connection to AP2 may be used for PDN Set 2 on an S2a connection or an S2b connection, for an NSWO connection, or for any combination of connections. At 1504, the wide-area RAN may determine to start RLC aggregation. At 1506, the wide-area RAN BS may send a command to the UE to start RAN aggregation with AP1 512*a*. At 1508, the UE may connect to AP1 without disconnecting from AP2. In a first aspect of the disclosure, at 1510, if IFOM is supported by the UE and the RAN, the UE's access stratum (AS) may trigger upper layers of the UE's network stack to move IP flows of the RAN aggregation bearers from WLAN to the wide-area RAN. In a second aspect of the disclosure, at 1512, lower layers of the UE's network stack may send an indication to upper layers of the UE's network stack that RLC aggregation is active. The upper layers of the UE's network stack may trigger handover of PDN Set 2 to the wide-area RAN at 1512. The UE may also transfer IP traffic from NSWO to PDNs on the wide-area RAN at 1512.

FIG. 16 illustrates example operations 1600 for performing RAN aggregation, as described above with reference to FIGS. 8-15. The operations 1600 may be performed by a first base station (BS) of a wide-area radio access network (RAN), for example, eNodeB 510, shown in each of FIGS. 8-15. At 1602, the first BS may determine that a user equipment (UE), served by the first BS and by a second BS of a wireless local-area network (WLAN), is capable of participating in radio access network (RAN) aggregation. At 1604, the first BS may activate RAN aggregation for the UE of one or more bearers of one or more packet data network (PDN) connections with the first BS and at least one of the second BS or another BS of a WLAN, while maintaining the one or more PDN connections as active only over the RAN or over both the RAN and the WLAN simultaneously. The operation may be complete at this point, or optionally may continue to one or more of 1606, 1608, 1610, and 1612, which may be performed by the first BS or one or more other network entities. At 1606, the first BS may receive the identity of the second BS of the WLAN the UE is connected to or a list of the BSs of WLANs that are available. The first BS may receive the identity of the second BS or the list of BSs from the UE, or from another network entity (e.g., an MME). At 1608, the first BS receives, either periodically or upon request, a list of UEs that are connected to one or more BSs of WLANs. The first BS may receive the list of UEs from the second BS, or from another network entity (e.g., an MME or another BS of the WLAN). Another network entity of the RAN (e.g., an MME or another eNB) may request the list from the second BS and send it to the first BS. At 1610, the UE may send to the second BS of the WLAN the identity of the wide-area RAN the UE is connected to and the network identity of the UE. At 1612, the second BS of the WLAN may verify it is configured to enable RAN aggregation and send to the RAN the identity of the UE. The first BS may receive the identity of the UE from the second BS of the WLAN, or another network entity (e.g., an MME).

According to aspects of the present disclosure, the first BS may determine that the UE is capable of participating in RAN aggregation based on an indication received from the UE. For example, an eNB may receive a capabilities exchange message from a connected UE that the UE is capable of participating in RAN aggregation.

According to aspects of the present disclosure, the first BS may determine that the UE is capable of participating in RAN aggregation based on an indication received from the second BS. For example, an AP may signal to an eNB that a UE being served by the AP is capable of participating in RAN aggregation.

According to aspects of the present disclosure, activating RAN aggregation comprises causing the UE to access the second BS using a network identifier different from a network identifier the UE is currently using to access the second BS. For example, an eNB may send a message to a UE that is connected via a first connection to a WLAN AP directing the UE to connect via a second connection to the WLAN AP using a MAC ID that is different from a MAC ID the UE is using on the first connection.

FIG. 17 illustrates example operations 1700 for performing RAN aggregation, as described above with reference to FIGS. 8-15. The operations 1700 may be performed by a user equipment (UE), for example, E-UTRA UEs 508 or 802, shown in each of FIGS. 8-15. At 1702, the UE may receive an indication to begin radio access network (RAN) aggregation of one or more bearers belonging to one or more packet data network (PDN) connections while being served by a first base station (BS) of a wireless local-area network (WLAN) and a second BS of a RAN. At 1704, the UE may take action to perform RAN aggregation of the one or more bearers belonging to one or more PDN connections while maintaining the one or more PDN connections as active only over the RAN or over both the RAN and the WLAN simultaneously.

According to aspects of the present disclosure, taking action may comprise the UE accessing the first BS using a different network identifier than the UE is currently using to access the first BS. For example, a UE that is connected via a first connection to a WLAN AP may connect via a second connection to the WLAN AP using a MAC ID that is different from a MAC ID the UE is using on the first connection.

According to aspects of the present disclosure, taking action may comprise the UE connecting to a third BS of a WLAN. For example, a UE may disconnect from a WLAN AP that is not capable of participating in RAN aggregation and connect to a WLAN AP that is capable of participating in RAN aggregation.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a first base station (BS) of a wide-area radio access network (RAN), comprising:
determining that a user equipment (UE), served by the first BS and by a second BS of a wireless local-area network (WLAN), is capable of participating in radio access network (RAN) aggregation; and
activating RAN aggregation for the UE of one or more bearers of one or more packet data network (PDN) connections with the first BS and at least one of:
the second BS, or
another BS of the WLAN or of another WLAN, while maintaining the one or more PDN connections as active only over the RAN or over both the RAN and one of the WLAN or the other WLAN simultaneously, wherein activating RAN aggregation comprises causing the UE to access the second BS using a network identifier different from another network identifier the UE is currently using to access the second BS.

2. The method of claim 1, wherein the determination is based on an indication received from the UE.

3. The method of claim 1, wherein the determination is based on an indication received from the second BS.

4. The method of claim 1, wherein the UE is capable of connecting to only a single WLAN BS at one time.

5. The method of claim 1, wherein activating RAN aggregation comprises causing the UE to access the other BS of the WLAN or the other WLAN.

6. The method of claim 1, further comprising receiving from the UE the identity of the second BS of the WLAN the UE is connected to or a list of BSs of WLANs that are available.

7. A method for wireless communications by a first base station (BS) of a wide-area radio access network (RAN), comprising:
determining that a user equipment (UE), served by the first BS and by a second BS of a wireless local-area network (WLAN), is capable of participating in radio access network (RAN) aggregation;
activating RAN aggregation for the UE of one or more bearers of one or more packet data network (PDN) connections with the first BS and at least one of:
the second BS, or
another BS of the WLAN or of another WLAN, while maintaining the one or more PDN connections as active only over the RAN or over both the RAN and one of the WLAN or the other WLAN simultaneously; and
receiving from the second BS of the WLAN, either periodically or upon request, a list of UEs that are connected to one or more BSs of WLANs.

8. The method of claim 1, further comprising receiving from the second BS of the WLAN the identity of the UE.

9. A method for wireless communications by a user equipment (UE), comprising:

receiving an indication to begin radio access network (RAN) aggregation of one or more bearers belonging to one or more packet data network (PDN) connections while being served by a first base station (BS) of a wireless local-area network (WLAN) and a second BS of a RAN; and taking action to perform RAN aggregation of the one or more bearers belonging to one or more PDN connections while maintaining the one or more PDN connections as active only over the RAN or over both the RAN and the WLAN simultaneously, wherein taking action comprises accessing the first BS using a different network identifier than another network identifier the UE is currently using to access the first BS.

10. The method of claim 9, wherein taking action comprises disconnecting from the first BS without disconnecting one or more S2a and S2b interface connections associated with the UE and served by the first BS.

11. The method of claim 9, wherein taking action comprises connecting to a third BS of a WLAN.

12. The method of claim 11, wherein taking action further comprises disconnecting from the first BS.

13. The method of claim 11, wherein taking action further comprises performing internet protocol (IP) flow mobility (IFOM) signaling.

14. A first base station (BS) of a wide-area radio access network (RAN), comprising:
at least one processor configured to:
determine that a user equipment (UE), served by the first BS and by a second BS of a wireless local-area network (WLAN), is capable of participating in radio access network (RAN) aggregation; and
activate RAN aggregation for the UE of one or more bearers of one or more packet data network (PDN) connections with the first BS and at least one of:
the second BS, or
another BS of the WLAN or of another WLAN, while maintaining the one or more PDN connections as active only over the RAN or over both the RAN and one of the WLAN or the other WLAN simultaneously, wherein activating RAN aggregation comprises causing the UE to access the second BS using a network identifier different from another network identifier the UE is currently using to access the second BS; and
a memory coupled with the at least one processor.

15. The first BS of claim 14, wherein the at least one processor is configured to make the determination based on an indication obtained from the UE.

16. The first BS of claim 14, wherein the at least one processor is configured to make the determination based on an indication obtained from the second BS.

17. The first BS of claim 14, wherein the UE is capable of connecting to only a single WLAN BS at one time.

18. The first BS of claim 14, wherein activating RAN aggregation comprises causing the UE to access the other BS of the WLAN or the other WLAN.

19. The first BS of claim 14, wherein the at least one processor is further configured to obtain from the UE the identity of the second BS of the WLAN the UE is connected to or a list of BSs of WLANs that are available.

20. A first base station (BS) of a wide-area radio access network (RAN), comprising:
at least one processor configured to:
determine that a user equipment (UE), served by the first BS and by a second BS of a wireless local-area network (WLAN), is capable of participating in radio access network (RAN) aggregation; and
activate RAN aggregation for the UE of one or more bearers of one or more packet data network (PDN) connections with the first BS and at least one of:
the second BS or
another BS of the WLAN or of another WLAN, while maintaining the one or more PDN connections as active only over the RAN or over both the RAN and one of the WLAN or the other WLAN simultaneously;
obtain from the second BS of the WLAN, either periodically or upon request, a list of UEs that are connected to one or more BSs of WLANs; and
a memory coupled with the at least one processor.

21. The first BS of claim 14, wherein the at least one processor is further configured to obtain from the second BS of the WLAN the identity of the UE.

22. A user equipment (UE), comprising:
at least one processor configured to:
receive an indication to begin radio access network (RAN) aggregation of one or more bearers belonging to one or more packet data network (PDN) connections while being served by a first base station (BS) of a wireless local-area network (WLAN) and a second BS of a RAN; and
take action to perform RAN aggregation of the one or more bearers belonging to one or more PDN connections while maintaining the one or more PDN connections as active only over the RAN or over both the RAN and the WLAN simultaneously, wherein taking action comprises accessing the first BS using a different network identifier than another network identifier the UE is currently using to access the first BS; and
a memory coupled with the at least one processor.

23. The UE of claim 22, wherein taking action comprises causing the UE to disconnect from the first BS without disconnecting one or more S2a and S2b interface connections associated with the UE and served by the first BS.

24. The UE of claim 22, wherein taking action comprises causing the UE to connect to a third BS of the WLAN or the other WLAN.

25. The UE of claim 24, wherein taking action further comprises causing the UE to disconnect from the first BS.

26. The UE of claim 24, wherein taking action further comprises causing the UE to perform internet protocol (IP) flow mobility (IFOM) signaling.

* * * * *